(12) United States Patent
Miyake et al.

(10) Patent No.: US 7,524,583 B2
(45) Date of Patent: Apr. 28, 2009

(54) NON-AQUEOUS ELECTROLYTIC SECONDARY BATTERY

(75) Inventors: Masahide Miyake, Kobe (JP); Masahisa Fujimoto, Osaka (JP); Hideyuki Koga, Kobe (JP); Hisaki Tarui, Kobe (JP); Shin Fujitani, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 856 days.

(21) Appl. No.: 10/495,106

(22) PCT Filed: Dec. 20, 2002

(86) PCT No.: PCT/JP02/13405

§ 371 (c)(1),
(2), (4) Date: May 10, 2004

(87) PCT Pub. No.: WO03/054986

PCT Pub. Date: Dec. 20, 2002

(65) Prior Publication Data

US 2005/0019655 A1  Jan. 27, 2005

(30) Foreign Application Priority Data

Dec. 21, 2001 (JP) ............................. 2001-389259
Jun. 19, 2002 (JP) ............................. 2002-178142

(51) Int. Cl.
  *H01M 4/58* (2006.01)
  *H01M 6/16* (2006.01)
(52) U.S. Cl. ............................. 429/231.1; 429/231.95; 429/324; 429/339; 429/340
(58) Field of Classification Search ...................... None
  See application file for complete search history.

(56) References Cited

U.S. PATENT DOCUMENTS

| | | | |
|---|---|---|---|
| 4,463,071 A | | 7/1984 | Gifford et al. |
| 4,463,072 A | | 7/1984 | Gifford et al. |
| 4,839,249 A | * | 6/1989 | Jones et al. .................. 429/324 |
| 4,869,977 A | * | 9/1989 | Connolly et al. ............ 429/101 |
| 5,554,458 A | | 9/1996 | Noda et al. |
| 5,681,669 A | * | 10/1997 | Yoshio et al. ................ 429/332 |
| 5,814,420 A | * | 9/1998 | Chu ............................. 429/104 |
| 5,981,107 A | * | 11/1999 | Hamano et al. ......... 429/231.95 |
| 7,074,523 B2 | * | 7/2006 | Arai et al. .................... 429/326 |

FOREIGN PATENT DOCUMENTS

| | | |
|---|---|---|
| JP | 3-225775 | 10/1991 |
| JP | 8-138742 | 5/1996 |
| JP | 8-245493 | 9/1996 |
| JP | 9-293513 | 11/1997 |
| JP | 11-345611 | 12/1999 |
| JP | 2002-138077 | 5/2000 |
| JP | 2002-228223 | 8/2000 |
| JP | 2000-311684 | 11/2000 |
| JP | 2001-266884 | 9/2001 |
| JP | 2001-297768 | 10/2001 |
| JP | 2002-75446 | 3/2002 |
| JP | 2002-110231 | 4/2002 |
| JP | 2002-352796 | 12/2002 |
| WO | WO01/47088 | 6/2001 |
| WO | WO01/057943 | 8/2001 |
| WO | WO01/58805 | 8/2001 |

\* cited by examiner

*Primary Examiner*—Patrick Ryan
*Assistant Examiner*—Julian Mercado
(74) *Attorney, Agent, or Firm*—Westerman, Hattori, Daniels & Adrian, LLP.

(57) ABSTRACT

A non-aqueous electrolyte secondary cell is provided with a positive electrode, a negative electrode, and a non-aqueous electrolyte solution, wherein said positive electrode comprises sulfur and said non-aqueous electrolyte solution comprises a room-temperature molten salt having a melting point of 60° C. or less.

21 Claims, 22 Drawing Sheets

NON-AQUEOUS ELECTROLYTIC SECONDARY BATTERY

TECHNICAL FIELD

The present invention relates to a non-aqueous electrolyte secondary cell provided with a positive electrode, a negative electrode, and a non-aqueous electrolyte solution, or more particularly, to a non-aqueous electrolyte secondary cell enhanced in higher energy density by combination of material employed as said positive electrode and the non-aqueous electrolyte solution thereof.

BACKGROUND ART

As one type of secondary cells featuring high energy density, a non-aqueous electrolyte secondary cell has come into practical use, wherein a non-aqueous electrolyte solution is employed and charge/discharge is performed by way of transferring lithium ions between a positive electrode and a negative electrode.

Such a non-aqueous electrolyte secondary cell generally employs a positive electrode which is a lithium-transition metal compound oxide such as $LiCoO_2$ and the like, a negative electrode which is lithium metal, a lithium alloy, or a carbon material capable of absorbing and desorbing lithium, and a non-aqueous electrolyte solution wherein an electrolyte of lithium salt, such as $LiBF_4$ or $LiPF_6$, is dissolved in an organic solvent such as ethylene carbonate or diethyl carbonate.

Recently, further, such a non-aqueous electrolyte secondary cell has come into practical use as an electric current source of portable equipment and the like, and accordingly, the non-aqueous electrolyte secondary cell having higher energy density has been desired.

Unfortunately, however, in such an ordinary non-aqueous electrolyte secondary cell, the lithium-transition metal compound oxide such as $LiCoO_2$ employed as the positive electrode thereof is large in weight and small in reactive electron number, therefore, capacity per unit weight is not sufficiently improved.

Further, sulfur is generally known as positive electrode material having large theoretical capacity, however, where a simple substance of sulfur is employed as the positive electrode, very high temperature is required for reversible reaction with lithium, therefore, the resultant non-aqueous electrolyte secondary cell can not come into a generous use.

Therefore, recently, there has been proposed use of an organic disulfide compound including DMcT (2,5-dimercapto-1,3,4-thiadiazole) as the positive electrode material having large capacity and high energy density. However, the organic disulfide compound used as the positive electrode material reversibly reacts with lithium only at a high temperature of more than 60° C., therefore, the resultant non-aqueous electrolyte secondary cell can not come into the generous use.

Further, more recently, Japanese Patent Application Nos.4-267073, 8-115724, and so on have proposed the use of the positive electrode material which is a compound of the organic disulfide compound including DMcT with conductive macromolecule including polyaniline for the purpose of charge/discharge reaction at normal temperature.

However, even in the use of the organic disulfide compound as the positive electrode material, a part concerned with the charge/discharge reaction is only disulfide linkage portion, and other portions such as carbon portion or hydrogen portion are not concerned with the reaction, therefore, the capacity per unit weight is not sufficiently improved.

DISCLOSURE OF THE INVENTION

The invention is directed to solution to aforementioned problems of a non-aqueous electrolyte secondary cell provided with a positive electrode, a negative electrode, and a non-aqueous electrolyte solution.

Specifically, the present invention has an object to provide a non-aqueous electrolyte secondary cell capable of charge/discharge reactions at normal temperature and having very high energy density, even in a case where the positive electrode comprises sulfur.

A non-aqueous electrolyte secondary cell according to a first aspect of the invention is provided with a positive electrode, a negative electrode, and a non-aqueous electrolyte solution, wherein said positive electrode comprises only a simple substance of sulfur as an active material and said non-aqueous electrolyte solution comprises a room-temperature molten salt having a melting point of 60° C. or less.

A non-aqueous electrolyte secondary cell according to a second aspect of the invention is provided with a positive electrode, a negative electrode, and a non-aqueous electrolyte solution, wherein said non-aqueous electrolyte solution comprises a room-temperature molten salt having a melting point of 60° C. or less and sulfur reduction product.

A non-aqueous electrolyte secondary cell according to a third aspect of the invention is provided with a positive electrode, a negative electrode, and a non-aqueous electrolyte solution, wherein said positive electrode comprises only a simple substance of sulfur as an active material and said non-aqueous electrolyte solution comprises a room-temperature molten salt having a melting point of 60° C. or less and at least one solvent selected from circular ether, chain ether, and carbonate fluoride.

A non-aqueous electrolyte secondary cell according to a fifth aspect of the invention is provided with a positive electrode, a negative electrode using material capable of absorbing and desorbing lithium, and a non-aqueous electrolyte solution, wherein said positive electrode comprises only a simple substance of sulfur as an active material and said non-aqueous electrolyte solution comprises a quaternary ammonium salt and a lithium salt.

As suggested by each of the above-mentioned non-aqueous electrolyte secondary cells, where the non-aqueous electrolyte secondary cell is provided with the positive electrode comprising only the simple substance of sulfur as the active material, wherein the non-aqueous electrolyte solution comprises any of the room-temperature molten salt having the melting point of 60° C. or less, the room-temperature molten salt having the melting point of 60° C. or less and lithium salt, the room-temperature molten salt having the melting point of 60° C. or less and at least one solvent selected from circular ether, chain ether, and carbonate fluoride, or the quaternary ammonium salt and the lithium salt, sulfur in the positive electrode reversibly reacts with lithium even in normal temperature.

As suggested by the non-aqueous electrolyte secondary cell of the second aspect of the invention, where the non-aqueous electrolyte solution comprises the room-temperature molten salt having the melting point of 60° C. or less and sulfur reduction product, sulfur in the positive electrode reversibly reacts with lithium even at normal temperature, and the non-aqueous electrolyte secondary cell can be charged/discharged at the normal temperature, and in a case where the positive electrode comprises sulfur, the non-aqueous electrolyte secondary cell also can be charged/discharged at the normal temperature.

The non-aqueous electrolyte solution can be used as a gel type electrolyte prepared by impregnating the above-mentioned non-aqueous electrolyte solution with polymer electrolyte such as polyethylene oxide or poly acrylonitrile. The non-aqueous electrolyte solution can also be used as an inorganic solid electrolyte such as LiI or $Li_3N$.

In the non-aqueous electrolyte cells employing alkaline earth metals or alkaline metals except for lithium such as calcium, magnesium, sodium, or potassium, it is believed that sulfur in the positive electrode reversibly reacts with the alkaline metals or the alkaline earth metals at the normal temperature for the effect of the above-mentioned non-aqueous electrolyte solution, thus, the non-aqueous electrolyte secondary cell can be charged/discharged at the normal temperature.

In the non-aqueous electrolyte secondary cell of the present invention, where the positive electrode comprises sulfur, the capacity per unit weight is further increased compared with organic disulfide.

In the positive electrode comprising sulfur, conductive agent is preferably added to the positive electrode in order to improve conductivity, hereby to improve charge/discharge characteristics. Examples of the conductive agent include conductive carbon material. In adding the conductive carbon material, an insufficient amount of additive results in insufficient improvement in the conductivity of the positive electrode whereas an excessive amount of the additive results in insufficient ratio of sulfur in the positive electrode with the result that large capacity is not attained. Therefore, the amount of the carbon material based on the whole is generally set in a range of 5 to 84 wt %, preferably in the range of 5 to 54 wt %, and more preferably in the range of 5 to 20 wt %.

Where the room-temperature molten salt having the melting point of 60° C. or less is used as suggested by the non-aqueous electrolyte secondary cell of the invention, the aforesaid room-temperature molten salt is a liquid consisting only of ions, having no vapor pressure and having nonflammable nature. Therefore, the room-temperature molten salt is not decomposed nor caused to burn during the abnormal operation such as overcharge. That is, this salt ensures a safe use of the cell which is not provided with the protection circuit. Where the lithium salt is added to the room-temperature molten salt as described above, a melting point of the resultant mixture is thought to be decreased from that of each of the salts so that the mixture is maintained in a liquid state.

What is required of the above room-temperature molten salt is to assume the liquid state in a wide temperature range. In general, a usable room-temperature molten salt may be in liquid state at temperatures in the range of −20° C. to 60° C. and may preferably have a conductivity of $10^{-4}$ S/cm or more.

Examples of a salt usable as such a room-temperature molten salt include quaternary ammonium salts and imidazolium salts.

Examples of usable quaternary ammonium salts as the room-temperature molten salt include at least one of trimethylpropylammonium.bis(trifluoromethylsulfonyl)imide $(CH_3)_3N^+(C_3H_7)N^-(SO_2CF_3)_2$, trimethyloctylammonium.bis(trifluoromethylsulfonyl)imide$(CH_3)_3N^+(C_8H_{17})N^-(SO_2CF_3)_2$, trimethylallylammonium.bis(trifluoromethylsulfonyl)imide$(CH_3)_3N^+(Allyl)N^-(SO_2CF_3)_2$, trimethylhexylammonium.bis(trifluoromethylsulfonyl)imide$(CH_3)_3N^+(C_6H_{13})N^-(SO_2CF_3)_2$, trimethylethylammonium.2,2,2-trifluoro-N-(trifluoromethylsulfonyl)acetamide$(CH_3)_3N^+(C_2H_5)(CF_3CO)N^-(SO_2CF_3)$, trimethylallylammonium.2,2,2-trifluoro-N-(trifluoromethylsulfonyl)acetamide$(CH_3)_3N^+(Allyl)(CF_3CO)N^-(SO_2CF_3)$, trimethylpropylammonium.2,2,2-trifluoro-N-(trifluoromethylsulfonyl)acetamide$(CH_3)_3$ $N^+(C_3H_7)(CF_3CO)N^-(SO_2CF_3)$, tetraethylammonium.2,2,2-trifluoro-N-(trifluoromethylsulfonyl)acetamide$(C_2H_5)_4$ $N^+(CF_3CO)N^-(SO_2CF_3)$, and triethylmethylammonium.2,2,2-trifluoro-N-(trifluoromethylsulfonyl)acetamide$(C_2H_5)_3$ $N^+(CH_3)(CF_3CO)N^-(SO_2CF_3)$.

Examples of usable imidazolium salts as the room-temperature molten salt include at least one of 1-ethyl-3-methylimidazolium.bis(pentafluoroethylsulfonyl)imide$(C_2H_5)$ $(C_3H_3N_2)^+(CH_3)N^-(SO_2C_2F_5)_2$, 1-ethyl-3-methylimidazolium.bis(trifluoromethylsulfonyl)imide $(C_2H_5)(C_3H_3N_2)^+(CH_3)N^-(SO_2CF_3)_2$, 1-ethyl-3-methylimidazolium.tetrafluoroborate$(C_2H_5)(C_3H_3N_2)^+$ $(CH_3)BF_4^-$, 1-ethyl-3-methylimidazolium hexafluorophosphate$(C_2H_5)(C_3H_3N_2)^+(CH_3)PF_6^-$.

The non-aqueous electrolyte solution may comprise organic solvents such as ethylene carbonate, diethyl carbonate, dimethyl carbonate, propylene carbonate, cyclic ether, chain ether, and carbonate fluoride in addition to the room-temperature molten salt.

Examples of the usable cyclic ether include at least one of 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether.

Examples of the usable chain ether include at least one of 1,2-dimethoxyethane, diethyl ether, dipropyl ether, diisopropyl ether, dibuthyl ether, dihexyl ether, ethylvinyl ether, buthylvinyl ether, methylphenyl ether, ethylphenyl ether, buthylphenyl ether, pentylphenyl ether, methoxy toluene, benzylethyl ether, diphenyl ether, dibenzyl ether, o-dimethoxy benzene, 1,2-dimethoxyethane, 1,2-dibutoxyethane, diethylene glycol dimethyl ether, diethylene glycol ethyl ether, diethylene glycol dibuthyl ether, 1,1-dimethoxy methane, 1,1-diethoxy ethane, triethylene glycol dimethyl ether, and tetraethylene glycol dimethyl ether.

Examples of the usable carbonate fluoride include at least one of trifluoropropylene carbonate and fluoroethylene carbonate.

Examples of the quaternary ammonium salts usable for the non-aqueous electrolyte solution of the non-aqueous electrolyte secondary cell according to the fifth aspect of the invention include tetramethylammonium.tetrafluoroborate$(CH_3)_4$ $N^+BF_4$, tetramethylammonium.hexafluorophosphate$(CH_3)_4$ $N^+PF_6$, tetraethylammonium.tetrafluoroborate$(C_2H_5)_4N^+$ $BF_4$, and tetraethylammonium.hexafluorophosphate $(C_2H_5)_4$ $N^+PF_6$ in addition to the quaternary ammonium salts as the room-temperature molten salt.

Electrolytes commonly used in the conventional non-aqueous electrolyte secondary cells may be used as the lithium salt to be mixed with the non-aqueous electrolyte solution of the non-aqueous electrolyte secondary cell of the present invention. Examples of the usable lithium salt include at least of $LiBF_4$, $LiPF_6$, $LiCF_3SO_3$, $LiC_4F_9SO_3$, $LiN(CF_3SO_2)_2$, $LiN(C_2F_5SO_2)_2$, $LiN(CF_3SO_2)(COCF_3)$ and $LiAsF_6$.

In the non-aqueous electrolyte secondary cell of the present invention, materials commonly used in the conventional non-aqueous electrolyte secondary cells may be used as the material capable of absorbing and desorbing lithium for the negative electrode thereof. Examples of such materials include carbon materials such as lithium metal, lithium alloy, and graphite, however, for the purpose of obtaining the non-aqueous electrolyte secondary cell of high energy density, it is particularly desirable to employ silicon having large capacity as suggested in Japanese Patent Application Nos.2000-321200 and 2000-321201 filed by the present applicant.

In the non-aqueous electrolyte secondary cell of the present invention, one of the positive electrode and the negative electrode is provided with lithium which is concerned with the charge/discharge reactions.

BRIEF DESCRIPTION OF THE DRAWINGS

FIG. 25 is a graph representing initial charge/discharge characteristics of the test cell of comparative example 3;

FIG. 26 is a graph representing cyclic voltammetry of a positive electrode measured by scanning potential of the positive electrode of the test cell of Example 12;

FIG. 43 is a graph representing cyclic voltammetry of a positive electrode measured by scanning potential of the positive electrode of the test cell of Example 20.

BEST MODES FOR CARRYING OUT THE INVENTION

Examples will make it apparent that non-aqueous electrolyte secondary cells of the present invention are properly charged/discharged at room temperature, and have very high energy density, even in a case where a positive electrode comprises sulfur. It is to be distinctly appreciated that the non-aqueous electrolyte secondary cells of the present invention should not be limited to the following examples but appropriate changes and modifications may be made in carrying out the invention without departing from the spirit and scope of the invention.

EXAMPLE 1

Example 1 used a non-aqueous electrolyte solution prepared by dissolving of $LiN(CF_3SO_2)_2$ as a lithium salt in trimethylpropylammonium.bis(trifluoromethylsulfonyl) imide $(CH_3)_3N^+(C_3H_7)N^-(SO_2CF_3)_2$ as a room-temperature molten salt in a concentration of 0.3 mol/l.

A positive electrode was prepared as follows. 20 parts by weight of sulfur, 70 parts by weight of acetylene black as a conductive agent, and 10 parts by weight of polytetrafluoroethylene as a binder were kneaded, then resultant mixture was stirred in a mortar for 30 minutes, and was subject to a pressure of 150 kg/cm² for 5 seconds in a molding die to be formed into a disk with a diameter of 10.3 mm. The disk was covered with an aluminum net.

Figure 1:
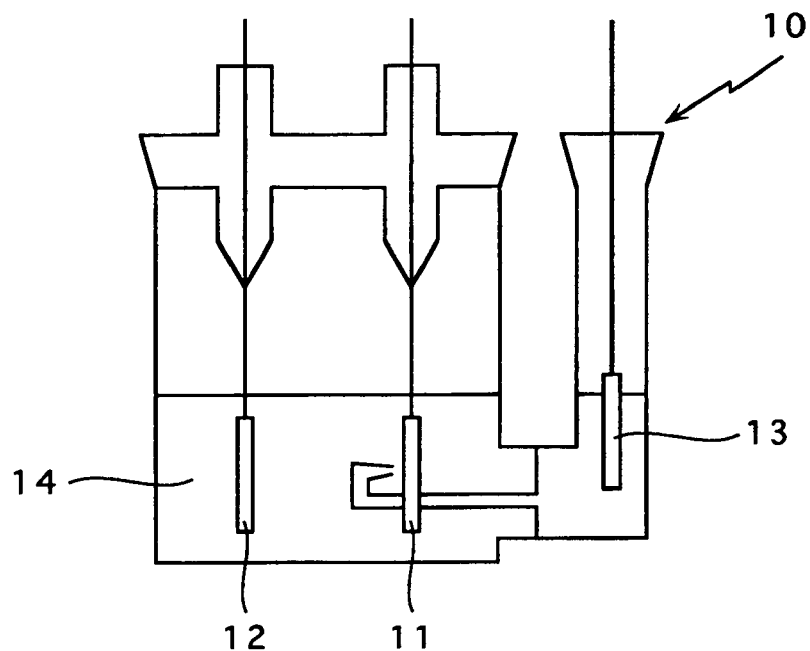
FIG. 1 is a diagram schematically illustrating a test cell fabricated in Examples 1 to 20 and comparative examples 1 to 5 of the invention.

A test cell of Example 1 was fabricated as follows. As shown in FIG. 1, the aforesaid non-aqueous electrolyte solution 14 was poured into a test cell vessel 10. On the other hand, the aforesaid positive electrode 11 was used as a working electrode whereas lithium metal pieces were used as a negative electrode 12 as a counter electrode and a reference electrode 13.

COMPARATIVE EXAMPLE 1

Comparative example 1 used a non-aqueous electrolyte solution prepared by mixing ethylene carbonate and dimethyl carbonate in a volume ratio of 1:1 to give a mixture solvent, in which $LiPF_6$ as a lithium salt was dissolved in a concentration of 1 mol/l. Except for the above, the same procedure as that in Example 1 was taken to fabricate a test cell of comparative example 1.

Figure 2:
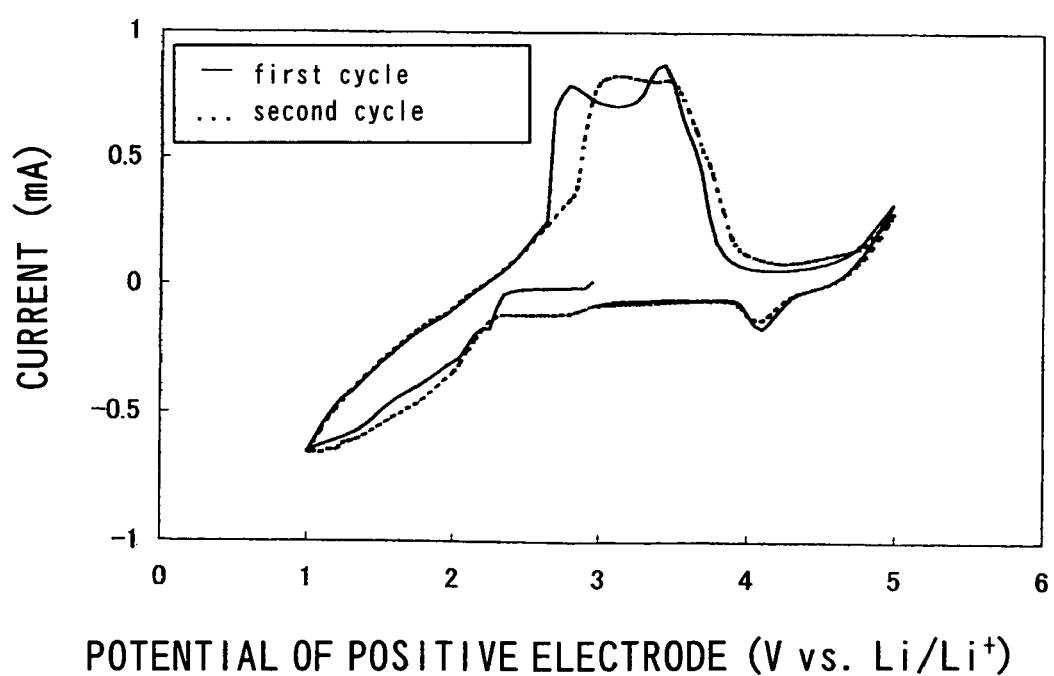
FIG. 2 is a graph representing cyclic voltammetry of a positive electrode measured by scanning potential of the positive electrode of the test cell of Example 1.

Cyclic volutammetry of the test cell of Example 1 was determined as follows. Potential scanning range of the positive electrode 11 versus the reference electrode 13 was set to be in a range of 1 to 5 V (vs.Li/Li$^+$), while potential scanning rate was set to be 0.5 mV/s. Then 2 cycles of an operation comprising steps of scanning an initial potential of the positive electrode 11, 2.9 V (vs.Li/Li$^+$), versus the reference electrode 13 in a reduction direction, and scanning said initial potential in an oxidation direction were carried out so as to determine the cyclic volutammetry at each cycle. The results are shown in FIG. 2.

Figure 3:
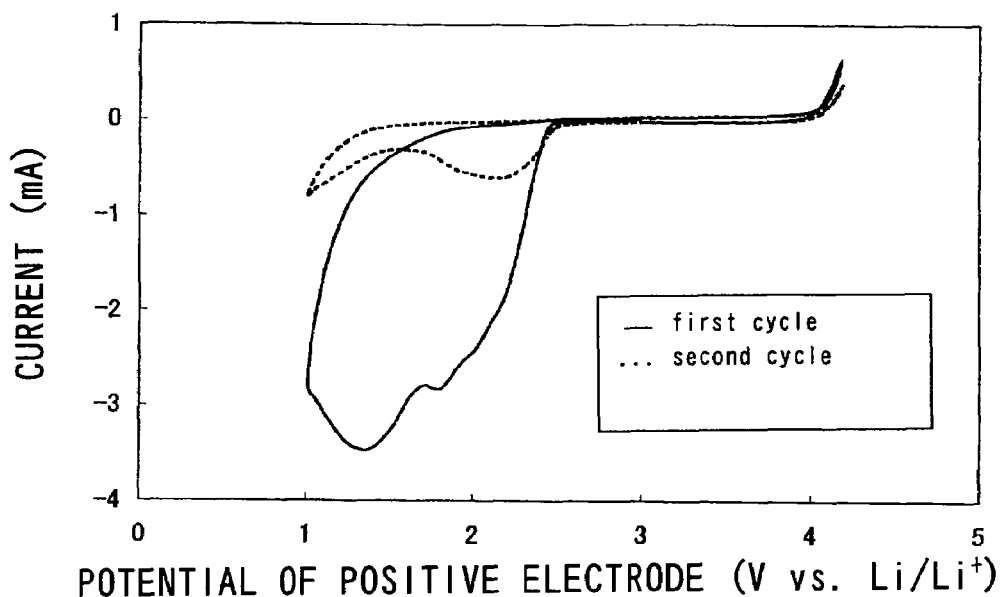
FIG. 3 is a graph representing cyclic voltammetry of a positive electrode measured by scanning potential of the positive electrode of the test cell of comparative example 1.

In addition, the cyclic volutammetry of the test cell of comparative example 1 was determined as follows. Potential scanning range of the positive electrode 11 versus the reference electrode 13 was set to be in a range of 1 to 4.2 V (vs.Li/Li$^+$), while potential scanning rate was set to be 0.5 mV/s. Then 2 cycles of the operation comprising steps of scanning the initial potential of the positive electrode 11, 3.0V (vs.Li/Li$^+$), versus the reference electrode 13 in the reduction direction, and scanning said initial potential in the oxidation direction were carried out so as to determine the cyclic volutammetry at each cycle. The results are shown in FIG. 3.

As a result, in the test cell of Example 1, in the scanning in the reduction direction, the reduction current began to extremely flow around less than 2.3 V (vs.Li/Li$^+$), and sulfur was expectedly reduced. In the scanning in the oxidation direction, oxidation peak existed in a range of 2.6 to 3.9 V (vs.Li/Li$^+$), and the reduced sulfur was expectedly oxidized in said potential range. The same results were attained also in the second cycle, and it is believed that sulfur reversibly reacted.

On the other hand, in the test cell of comparative example 1, in the scanning in the reduction direction, the reduction current began to flow around less than 2.4 V (vs.Li/Li$^+$), and sulfur was expectedly reduced. In the scanning in the oxidation direction, however, the oxidation peak did not exist, and the reduced sulfur expectedly was not oxidized. In the second cycle, in the scanning in the reduction direction, the reduction current flew around less than 2.4 V (vs.Li/Li$^+$), expectedly because the sulfur which was not reduced and remained in the prior reaction was reduced this time.

Figure 4:
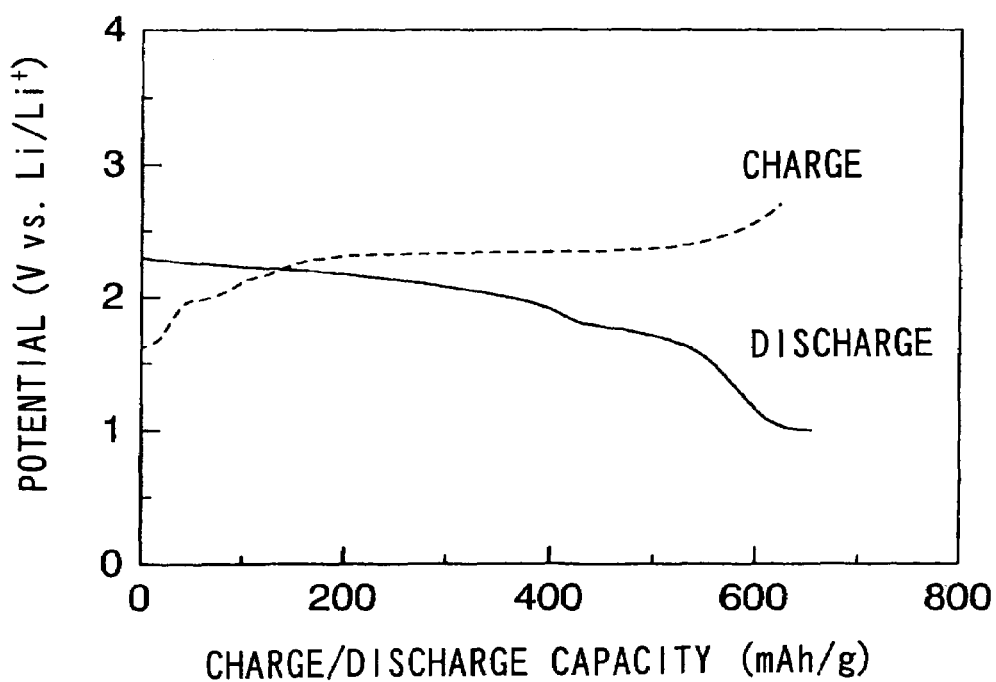
FIG. 4 is a graph representing initial charge/discharge characteristics of the test cell of Example 1.

The test cell of Example 1 was subject to a discharge at discharging current of 0.13 mA/cm² to a discharge cut-off potential of 1 V (vs.Li/Li$^+$) and a charge at charging current of 0.13 mA/cm² to a charge cut-off potential of 2.7V (vs.Li/Li$^+$), so as to inspect an initial charge/discharge characteristics thereof. The results are shown in FIG. 4. A discharge curve showing a relation between the potential in the discharge and capacity density per gram of sulfur is represented by a solid line, whereas a charge curve showing a relation between the potential in the charge and the capacity density per gram of sulfur is represented by a broken line.

As a result, in the test cell of Example 1, an initial discharge capacity density per gram of sulfur was about 654 mAh/g, which was less than 1675 mAh/g according to theoretical capacity density but was extremely higher than that of $LiCoO_2$ which has been generally used in the positive electrode. In addition, an initial charge capacity density per gram of sulfur was so high as about 623 mAh/g, which showed that sulfur reversibly reacted.

Figure 5:
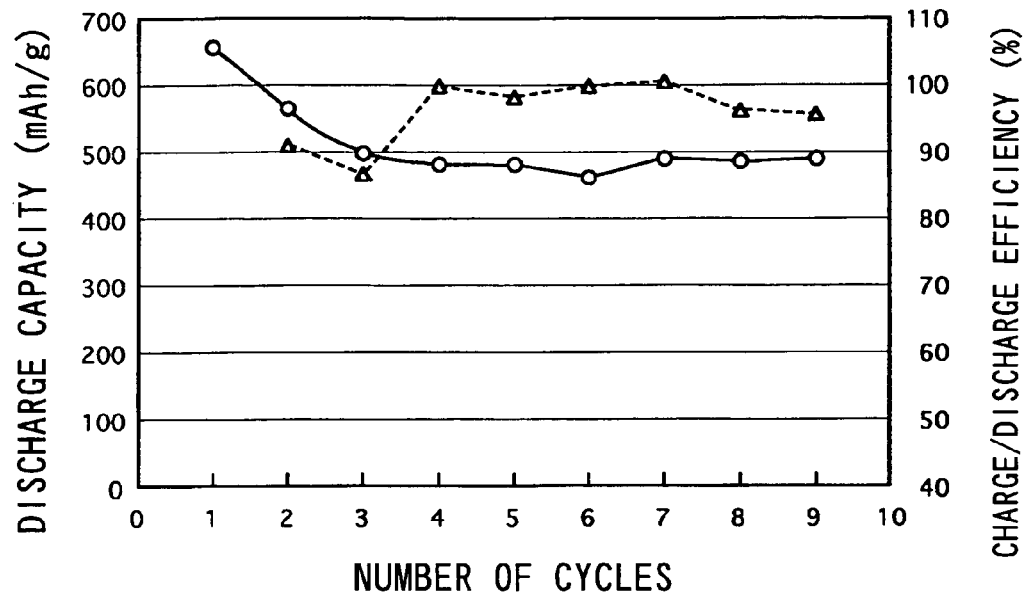
FIG. 5 is a graph representing discharge capacity and charge-discharge efficiency in each cycle of repeated charge/discharges of the test cell of Example 1.

Further, the test cell of Example 1 was subject to repeated charge/discharge processes comprising the discharge at discharging current of 0.13 mA/cm² to the discharge cut-off potential of 1 V (vs.Li/Li$^+$) and the charge at charging current of 0.13 mA/cm² to the charge cut-off potential of 2.7V (vs.Li/Li$^+$), so as to determine a charge capacity Qa (mAh/g) and a discharge capacity Qb (mAh/g) of the cell. Charge/discharge efficiency (%) in each cycle was determined based on the following equation. In FIG. 5, the discharge capacity (mAh/g) in each cycle is represented by a combination of a hollow circle and a solid line, whereas the charge/discharge efficiency (%) in each cycle is represented by a combination of a triangle and a broken line.

Charge/discharge efficiency (%)=($Qb/Qa$)×100

The results show that the test cell of Example 1 stably had the discharge capacity of about 490 mAh/g in the third and the succeeding cycles, and the charge/discharge efficiency was stably 100%.

In the test cell of Example 1, an average discharge voltage was about 2 V, and an energy density per gram of sulfur was about 980 mWh/g which was higher than that of $LiCoO_2$ (about 540 mWh/g) which has been generally used in the positive electrode.

REFERENCE EXAMPLE 1

Reference example 1 used the non-aqueous electrolyte solution prepared by dissolving $LiPF_6$ in γ-butyrolactone in a concentration of 1 mol/l. Except for the above, the same procedure as that in Example 1 was taken to fabricate a test cell of reference example 1.

Figure 6:
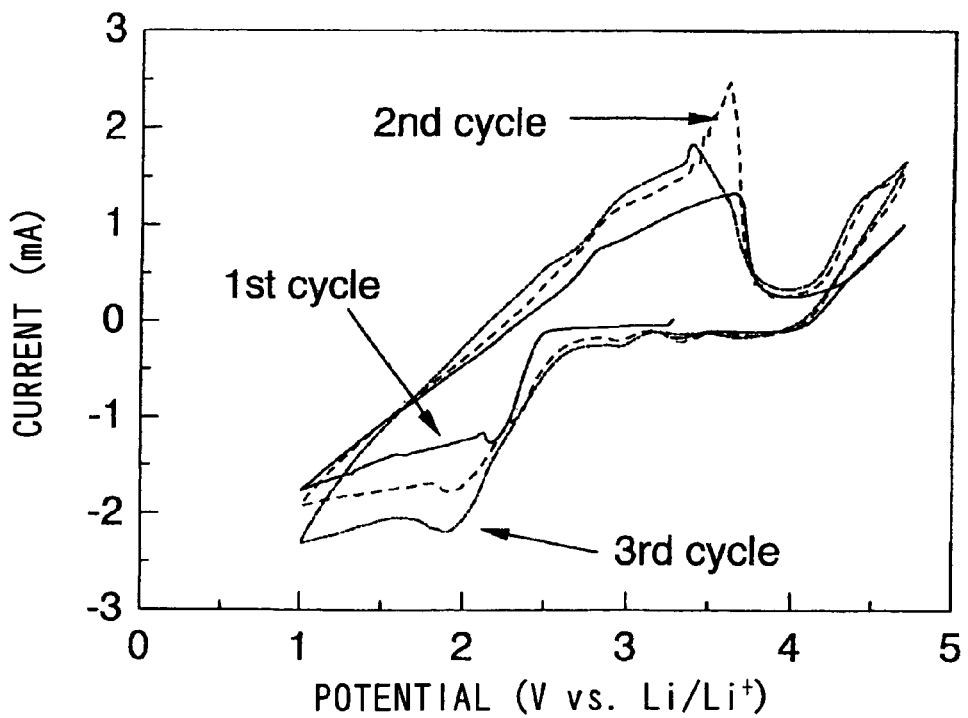
FIG. 6 is a graph representing cyclic voltammetry of a positive electrode measured by scanning potential of the positive electrode of the test cell of reference example 1.

In addition, the cyclic volutammetry of the test cell of reference example 1 was determined as follows. The potential scanning range of the positive electrode 11 versus the reference electrode 13 was set to be in a range of 1 to 4.7 V (vs.Li/Li$^+$), while the potential scanning rate was set to be 1.0 mV/s. Then 3 cycles of the operation comprising steps of scanning the initial potential of the positive electrode 11, 3.34 (vs.Li/Li$^+$), versus the reference electrode 13 in the reduction direction, and scanning said initial potential in the oxidation direction were carried out so as to determine the cyclic volutammetry at each cycle. The results are shown in FIG. 6.

As a result, in the test cell of reference example 1, in the scanning in the reduction direction, the reduction current began to flow around less than 2.3 V (vs.Li/Li$^+$), and sulfur was expectedly reduced. In the scanning in the oxidation direction, the oxidation peak existed in the range of 2.5 to 3.6V (vs.Li/Li$^+$), and the reduced sulfur was expectedly oxidized in said potential range. The same results were attained also in the second cycle, and it is believed that sulfur reversibly reacted. The present reference example used γ-butyrolactone as the solvent of the non-aqueous electrolyte solution, however, roughly the same results may be attained by use of circular ester including γ-valerolactone other than γ-butyrolactone.

EXAMPLE 3

Example 3 used the non-aqueous electrolyte solution prepared by dissolving LiPF$_6$ as the lithium salt in a concentration of 1 mol/l in a mixture solvent containing tetrafluoro propylene carbonate which is carbonate fluoride and trimethylpropylammonium.bis(trifluoromethylsulfonyl)imide $(CH_3)_3N^+(C_3H_7)N^-(SO_2CF_3)_2$ as a quaternary ammonium salt in a volume ratio of 1:1. Except for the above, the same procedure as that in Example 1 was taken to fabricate a test cell of Example 3.

COMPARATIVE EXAMPLE 2

Comparative example 2 used the non-aqueous electrolyte solution prepared by dissolving LiPF$_6$ as the lithium salt in tetrafluoro propylene carbonate in the concentration of 1 mol/l. Except for the above, the same procedure as that in Example 1 was taken to fabricate a test cell of comparative example 2.

Figure 7:
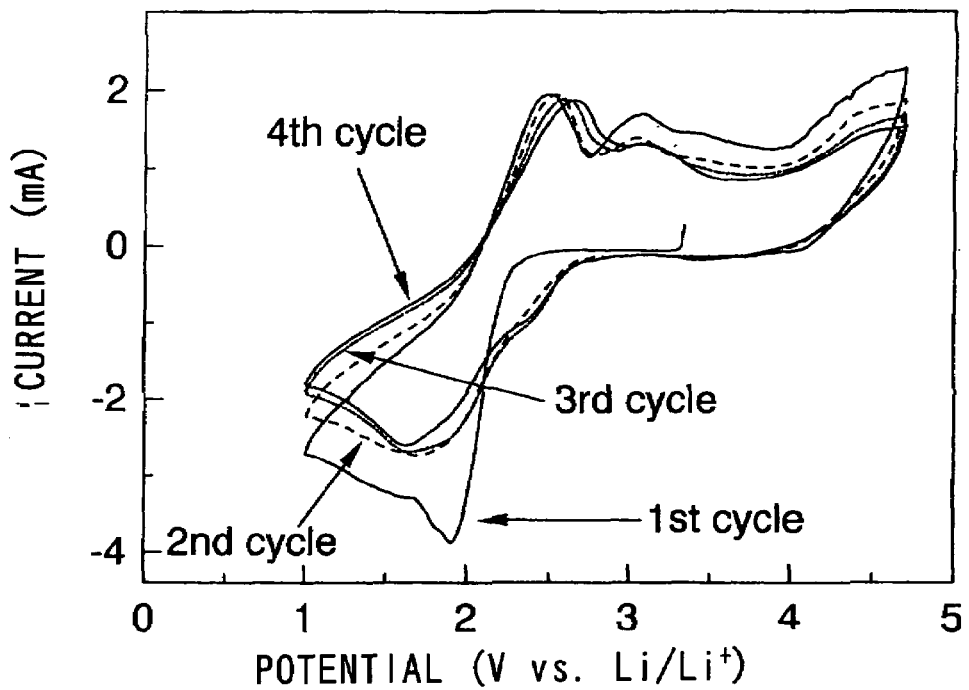
FIG. 7 is a graph representing cyclic voltammetry of a positive electrode measured by scanning potential of the positive electrode of the test cell of Example 3.
Figure 8:
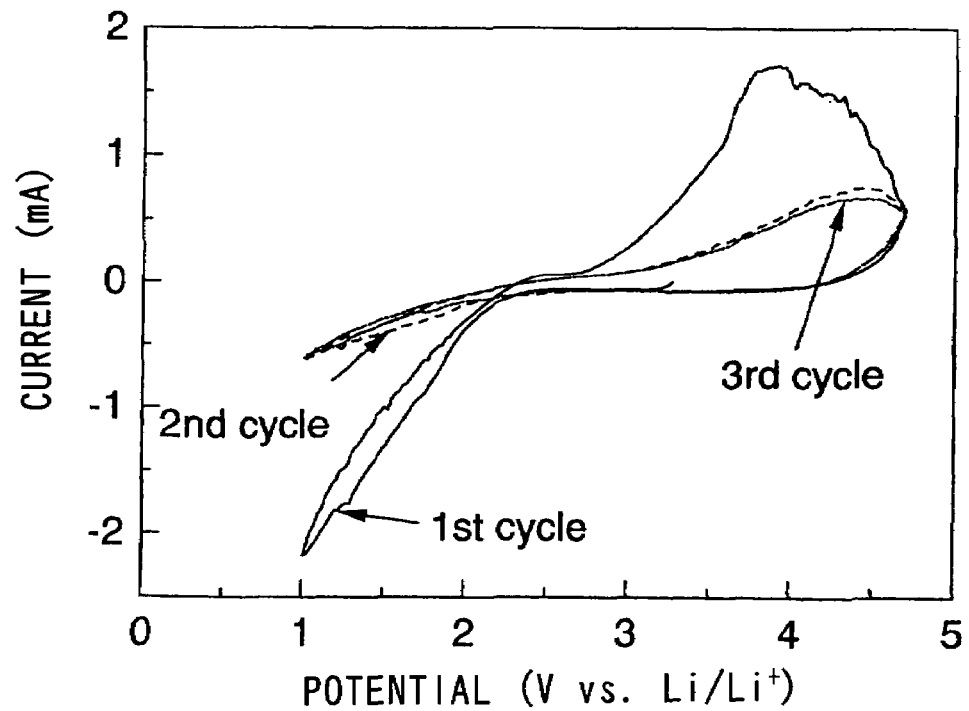
FIG. 8 is a graph representing cyclic voltammetry of a positive electrode measured by scanning potential of the positive electrode of the test cell of comparative example 2.

In addition, the cyclic volutammetry of the test cells of Example 3 and comparative example 2 was determined as follows. The potential scanning range of the positive electrode 11 versus the reference electrode 13 was set to be in the range of 1 to 4.7 V (vs.Li/Li$^+$), while the potential scanning rate was set to be 1 mV/s. Then the operation comprising steps of scanning the initial potential of the positive electrode 11, 3.34 V (vs.Li/Li$^+$), versus the reference electrode 13 in the reduction direction, and scanning said potential in the oxidation direction was carried out for 4 cycles to the test cell of Example 3 and for 3 cycles to the test cell of comparative example 2, so as to determine the cyclic volutammetry at each cycle. The results of the test cell of Example 3 are shown in FIG. 7, and the results of the test cell of comparative example 2 are shown in FIG. 8.

As a result, in the test cell of Example 3, in the scanning in the reduction direction, the reduction current began to flow around less than 2.3 V (vs.Li/Li$^+$), and sulfur is expectedly reduced. In the scanning in the oxidation direction, oxidation peak existed in the range of 2.0 to 3.0 V (vs.Li/Li$^+$), and the reduced sulfur was expectedly oxidized in said potential range. The same results were attained also in the second cycle, and it is believed that sulfur reversibly reacted.

On the other hand, in the test cell of comparative example 2, in the scanning in the reduction direction, the reduction current began to flow around less than 2.2 V (vs.Li/Li$^+$), and sulfur was expectedly reduced. In the scanning in the oxidation direction, oxidation peak existed around 4V (vs.Li/Li$^+$), and energy efficiency was degraded. From the second cycle and onwards, the oxidation peak and the reduction current were steeply decreased, and the reversibility was reduced.

In the test cell of Example 3, discharge potential of sulfur was about 2.0 V (vs. Li/Li$^+$), and the energy density converted from the theoretical capacity density of sulfur, 1675 mAh/g, was 3350 mWh/g, which was extremely higher than that of LiCoO$_2$ (about 540 mWh/g) which has been generally used in the positive electrode.

EXAMPLE 4

Example 4 used the non-aqueous electrolyte solution prepared by dissolving LiN(CF$_3$SO$_2$)$_2$ as the lithium salt in trimethylpropylammonium.bis(trifluoromethylsulfonyl)imide $(CH_3)_3N^+(C_3H_7)N^-(SO_2CF_3)_2$ as the room-temperature molten salt in the concentration of 0.3 mol/l. Then, in the non-aqueous electrolyte solution, sulfur and lithium were made to contact with each other to synthesize reduction product of sulfur. Further, the sulfur and lithium which were unreacted were withdrawn so as to prepare the non-aqueous electrolyte solution containing the reduction product of sulfur.

Except for the above, the same procedure as that in Example 1 was taken to fabricate a test cell of Example 4.

Figure 9:
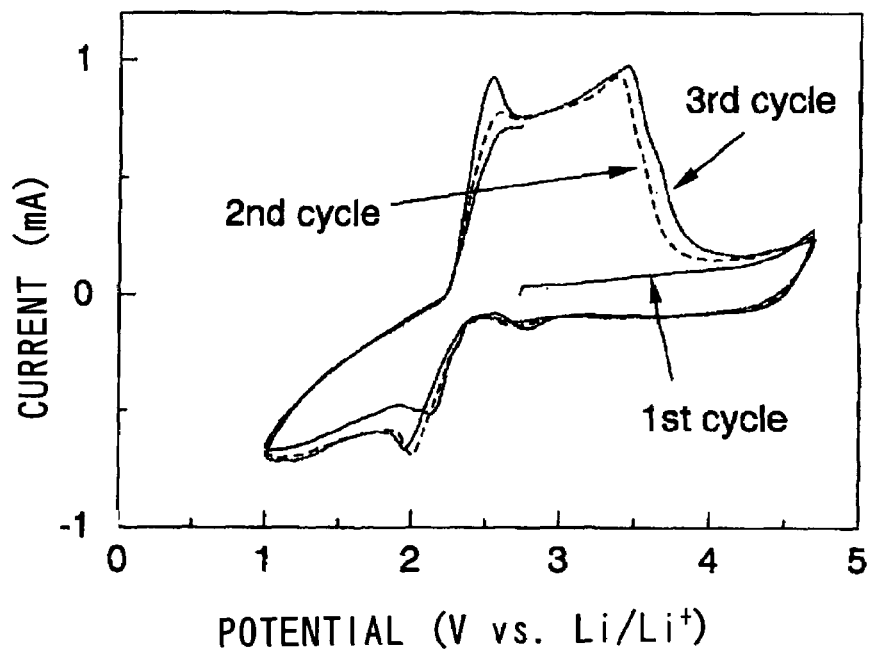
FIG. 9 is a graph representing cyclic voltammetry of a positive electrode measured by scanning potential of the positive electrode of the test cell of Example 4.

In addition, the cyclic volutammetry of the test cell of Example 4 was determined as follows. The potential scanning range of the positive electrode 11 versus the reference electrode 13 was set to be in the range of 1 to 4.7 V (vs.Li/Li$^+$), while the potential scanning rate was set to be 1.0 mV/s. Then the operation comprising steps of scanning the initial potential of the positive electrode 11, 2.7 V (vs.Li/Li$^+$), versus the reference electrode 13 in the oxidation direction, and scanning said potential in the reduction direction was carried out for 3 cycles, so as to determine the cyclic volutammetry at each cycle. The results are shown in FIG. 9.

As a result, in the test cell of Example 4, in the first scanning in the oxidation direction, the peak corresponding to the oxidation of sulfur thus reduced did not appear, however, in the scanning in the reduction direction, the reduction current began to flow around less than 2.4 V (vs.Li/Li$^+$), and sulfur was expectedly reduced. In the scanning in the oxidation direction, oxidation peak existed in the range of 2.2 to 3.9 V (vs.Li/Li$^+$), and the reduced sulfur was expectedly oxidized in said potential range. The same results were attained also from the second cycle and onwards, and it is believed that sulfur reversibly reacted.

Figure 10:
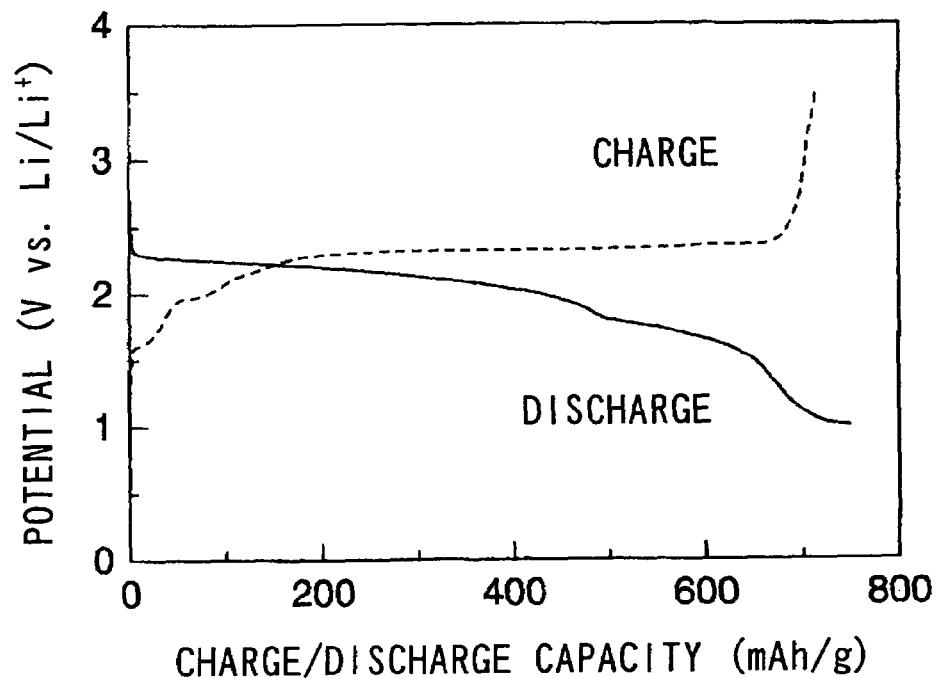
FIG. 10 is a graph representing initial charge/discharge characteristics of the test cell of Example 4.

The test cell of Example 4 was subject to the discharge at discharging current of 0.13 mA/cm$^2$ to the discharge cut-off potential of 1 V (vs.Li/Li$^+$) and the charge at charging current of 0.13 mA/cm$^2$ to the charge cut-off potential of 3.5V (vs.Li/Li$^+$), so as to inspect the initial charge/discharge characteristics thereof. The results are shown in FIG. 10. The discharge curve showing the relation between the potential in the discharge and the capacity density per gram of sulfur is represented by the solid line, whereas the charge curve showing the relation between the potential in the charge and the capacity density per gram of sulfur is represented by the broken line.

As a result, in the test cell of Example 4, the initial discharge capacity density per gram of sulfur was about 749 mAh/g, which was less than 1675 mAh/g according to theoretical capacity density but was extremely higher than that of LiCoO$_2$ which has been generally used in the positive electrode. In addition, the discharge capacity density of the test cell of Example 4 containing the reduction product of sulfur in the non-aqueous electrolyte solution thereof was higher than that of the test cell of Example 1.

EXAMPLE 5

Example 5 used the non-aqueous electrolyte solution prepared in the same manner as the Example 4.

The positive electrode was prepared as follows. 80 parts by weight of acetylene black as the conductive agent and 20 parts by weight of polytetrafluoro ethylene as the binder were kneaded, then the resultant mixture was stirred in the mortar for 30 minutes, and was subject to the pressure of 150 kg/cm$^2$ for 5 seconds in the molding die to be formed into the disk with the diameter of 10.3 mm. The disk was covered with the aluminum net.

Except for the above, the same procedure as that in Example 1 was taken to fabricate a test cell of Example 5.

Figure 11:
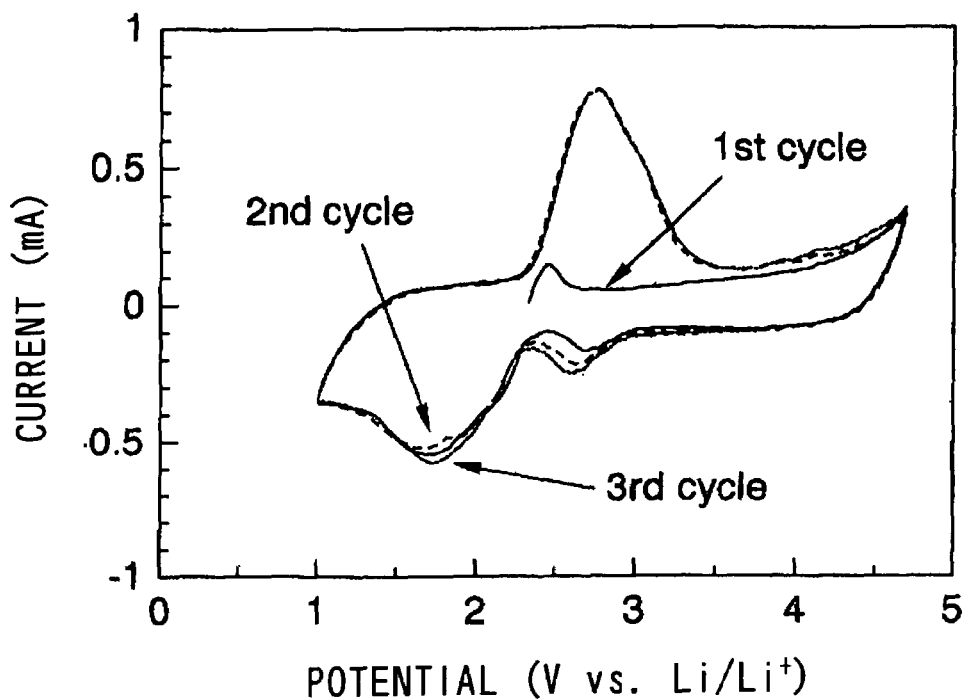
FIG. 11 is a graph representing cyclic voltammetry of a positive electrode measured by scanning potential of a positive electrode of the test cell of Example 5.

In addition, the cyclic volutammetry of the test cell of Example 5 was determined as follows. The potential scanning range of the positive electrode 11 versus the reference electrode 13 was set to be in the range of 1 to 4.7 V (vs.Li/Li$^+$), while the potential scanning rate was set to be 1.0 mV/s. Then the operation comprising steps of scanning the initial potential of the positive electrode 11, 2.3 V (vs.Li/Li$^+$), versus the reference electrode 13 in the oxidation direction, and scanning said potential in the reduction direction was carried out for 3 cycles, so as to determine the cyclic volutammetry at each cycle. The results are shown in FIG. 11.

As a result, in the test cell of Example 5, in the first scanning in the oxidation direction, the peak corresponding to the oxidation of sulfur thus reduced hardly appeared, however, in the scanning in the reduction direction, the reduction current began to flow around less than 2.3 V (vs.Li/Li$^+$), and sulfur was expectedly reduced. In the scanning in the oxidation direction, the oxidation peak existed in the range of 2.3 to 3.4V (vs.Li/Li$^+$), and the reduced sulfur was expectedly oxidized in said potential range. The same results were attained also from the second cycle and onwards, and it is believed that sulfur reversibly reacted.

EXAMPLE 6

Example 6 used trimethylpropylammonium.bis(trifluoromethylsulfonyl)imide$(CH_3)_3N^+(C_3H_7)N^-(SO_2CF_3)_2$ which is the room-temperature molten salt as the non-aqueous electrolyte solution without adding the lithium salt. Except for the above, the same procedure as that in Example 1 was taken to fabricate a test cell of Example 6.

Figure 12:
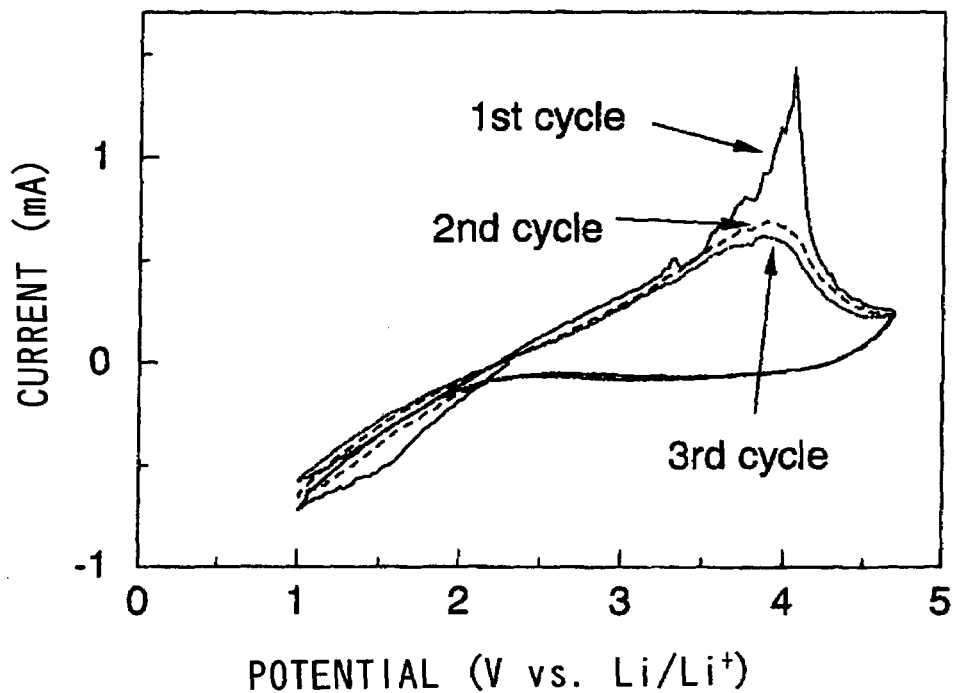
FIG. 12 is a graph representing cyclic voltammetry measured by scanning potential of the positive electrode of the test cell of Example 6.

In addition, the cyclic volutammetry of the test cell of Example 6 was determined as follows. The potential scanning range of the positive electrode 11 versus the reference electrode 13 was set to be in the range of 1 to 4.7 V (vs.Li/Li$^+$), while the potential scanning rate was set to be 1.0 mV/s. Then the operation comprising steps of scanning the initial potential of the positive electrode 11, 2.3 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 12.

As a result, in the test cell of Example 6, in the scanning in the reduction direction, the reduction current began to flow around less than 2 V (vs.Li/Li$^+$), and sulfur was expectedly reduced. In the scanning in the oxidation direction, the oxidation peak existed around 4 V (vs.Li/Li$^+$), and the reduced sulfur was expectedly oxidized around said potential. The same results were attained also from the second cycle and onwards, and it is believed that sulfur reversibly reacted.

Figure 13:
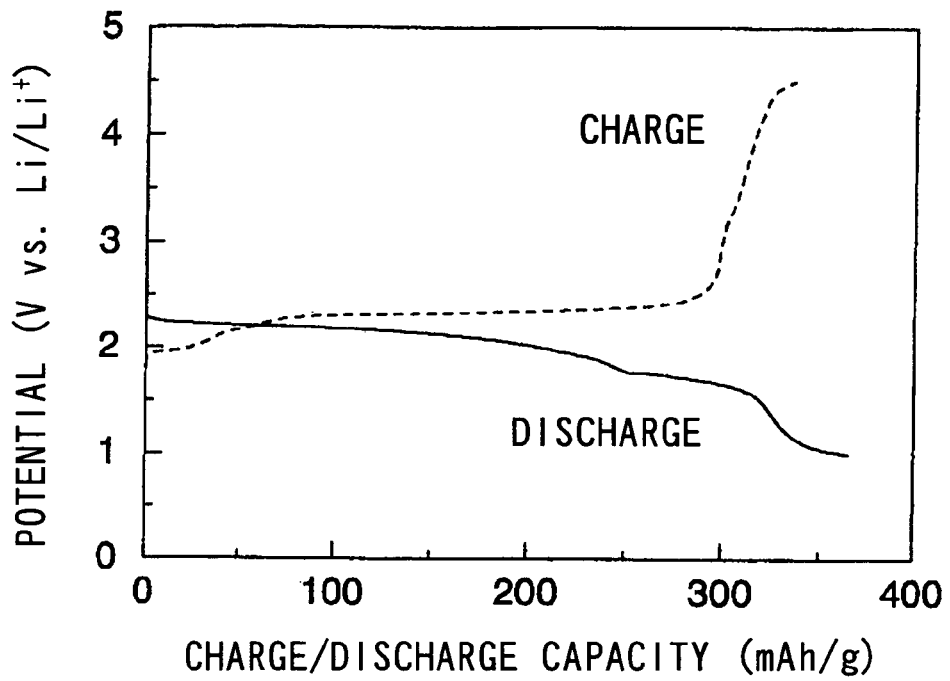
FIG. 13 is a graph representing initial charge/discharge characteristics of the test cell of Example 6.

The test cell of Example 6 was subject to the discharge at discharging current of 0.13 mA/cm$^2$ to the discharge cut-off potential of 1 V (vs.Li/Li$^+$) and the charge at charging current of 0.13 mA/cm$^2$ to the charge cut-off potential of 4.5V (vs.Li/Li$^+$), so as to inspect the initial charge/discharge characteristics thereof. The results are shown in FIG. 13. The discharge curve showing the relation between the potential in the discharge and the capacity density per gram of sulfur was represented by the solid line, whereas the charge curve showing the relation between the potential in the charge and the capacity density per gram of sulfur is represented by the broken line.

As a result, in the test cell of Example 6, the initial discharge capacity density per gram of sulfur was about 366 mAh/g, which was less than 1675 mAh/g according to theoretical capacity density but was extremely higher than that of LiCoO$_2$ which has been generally used in the positive electrode.

The results of Example 6 show that sulfur is charged/discharged even without presence of the lithium salt in the non-aqueous electrolyte solution. Therefore, not only where the negative electrode comprises material capable of absorbing and desorbing lithium ions but also where the negative electrode comprises material capable of absorbing and desorbing cation, sulfur is charged/discharged. Examples of said cation include alkaline earth metal ions such as calcium ion or magnesium ion, and alkaline metal ions such as sodium ion or potassium ion. The non-aqueous electrolyte solution may comprise alkaline earth salts such as calcium salt or magnesium salt, and alkaline metal salts such as sodium salt or potassium salt.

EXAMPLE 7

Example 7 used the non-aqueous electrolyte solution prepared by dissolving LiN(CF$_3$SO$_2$)$_2$ as the lithium salt in triethylmethylammonium.2,2,2-trifluoro-N-(trifluoromethylsulfonyl)acetamide$(C_2H_5)_3N^+(CH_3)(CF_3CO)N^-(SO_2CF_3)$ as the room-temperature molten salt in a concentration of 0.5 mol/l. Except for the above, the same procedure as that in Example 1 was taken to fabricate a test cell of Example 7.

Figure 14:
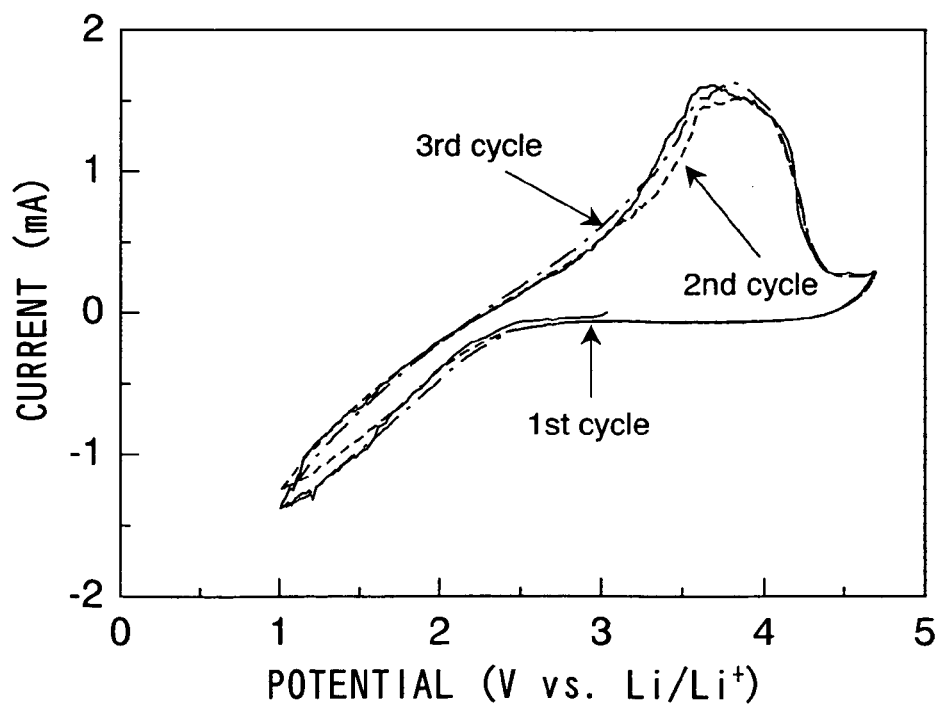
FIG. 14 is a graph representing cyclic voltammetry of a positive electrode measured by scanning potential of the positive electrode of the test cell of Example 7.

In addition, the cyclic volutammetry of the test cell of Example 7 was determined as follows. The potential scanning range of the positive electrode 11 versus the reference electrode 13 was set to be in the range of 1 to 4.7 V (vs.Li/Li$^+$), while potential scanning rate was set to be 1.0 mV/s. Then the operation comprising steps of scanning the initial potential of the positive electrode 11, 3.0 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 14.

As a result, in the test cell of Example 7, in the scanning in the reduction direction, the reduction current began to flow around less than 2.3 V (vs.Li/Li$^+$), and sulfur was expectedly reduced. In the scanning in the oxidation direction, the oxidation peak existed around 3.8 V (vs.Li/Li$^+$), and the reduced sulfur was expectedly oxidized around said potential. The same results are attained also from the second cycle and onwards, and it is believed that sulfur reversibly reacted.

Figure 15:
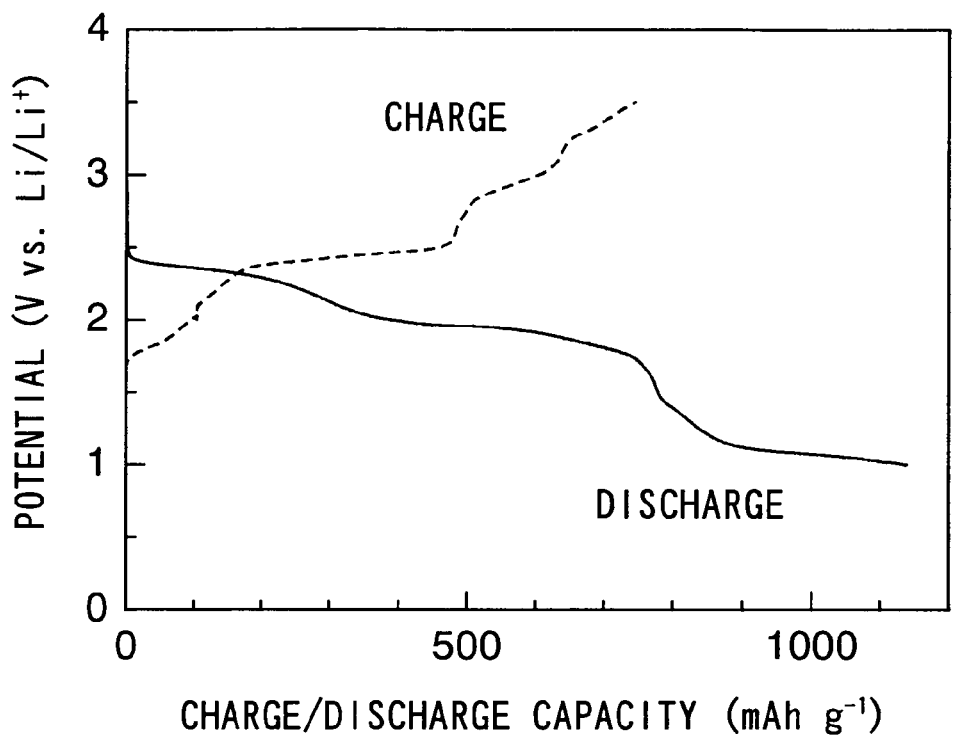
FIG. 15 is a graph representing initial charge/discharge characteristics of the test cell of Example 7.

The test cell of Example 7 was subject to the discharge at discharging current of 0.13 mA/cm$^2$ to the discharge cut-off potential of 1 V (vs.Li/Li$^+$) and the charge at charging current of 0.13 mA/cm$^2$ to the charge cut-off potential of 3.5V (vs.Li/Li$^+$), so as to inspect the initial charge/discharge characteristics thereof. The results are shown in FIG. 15. The discharge curve showing the relation between the potential in the discharge and the capacity density per gram of sulfur is represented by the solid line, whereas the charge curve showing the relation between the potential in the charge and the capacity density per gram of sulfur is represented by the broken line.

As a result, in the test cell of Example 7, the initial discharge capacity density per gram of sulfur was 1138 mAh/g, which was extremely higher than that of $LiCoO_2$ which has been generally used in the positive electrode.

EXAMPLE 8

Example 8 used the non-aqueous electrolyte solution prepared by dissolving $LiN(CF_3SO_2)_2$ as the lithium salt in trimethylhexylammonium.bis(trifluoromethylsulfonyl)imide $(CH_3)_3N^+(C_6H_{13})N^-(SO_2CF_3)_2$ as the room-temperature molten salt in a concentration of 0.5 mol/l. Except for the above, the same procedure as that in Example 1 was taken to fabricate a test cell of Example 8.

Figure 16:
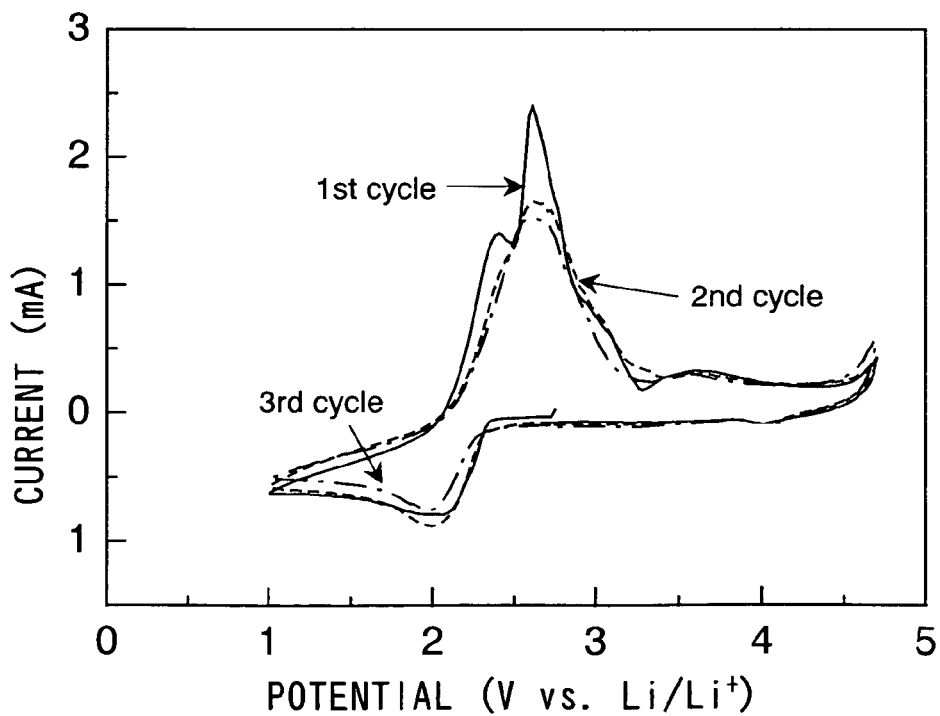
FIG. 16 is a graph representing cyclic voltammetry of a positive electrode measured by scanning potential of the positive electrode of the test cell of Example 8.

In addition, the cyclic volutammetry of the test cell of Example 8 was determined as follows. The potential scanning range of the positive electrode 11 versus the reference electrode 13 was set to be in the range of 1 to 4.7 V (vs.Li/Li$^+$), while potential scanning rate was set to be 1.0 mV/s. Then the operation comprising steps of scanning the initial potential of the positive electrode 11, 2.8 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 16.

As a result, in the test cell of Example 8, in the scanning in the reduction direction, the reduction current began to flow around less than 2.3 V (vs.Li/Li$^+$), and sulfur was expectedly reduced. In the scanning in the oxidation direction, the oxidation peak existed around 2.6 V (vs.Li/Li$^+$), and the reduced sulfur was expectedly oxidized around said potential. The same results were attained also from the second cycle and onwards, and it is believed that sulfur reversibly reacted.

Figure 17:
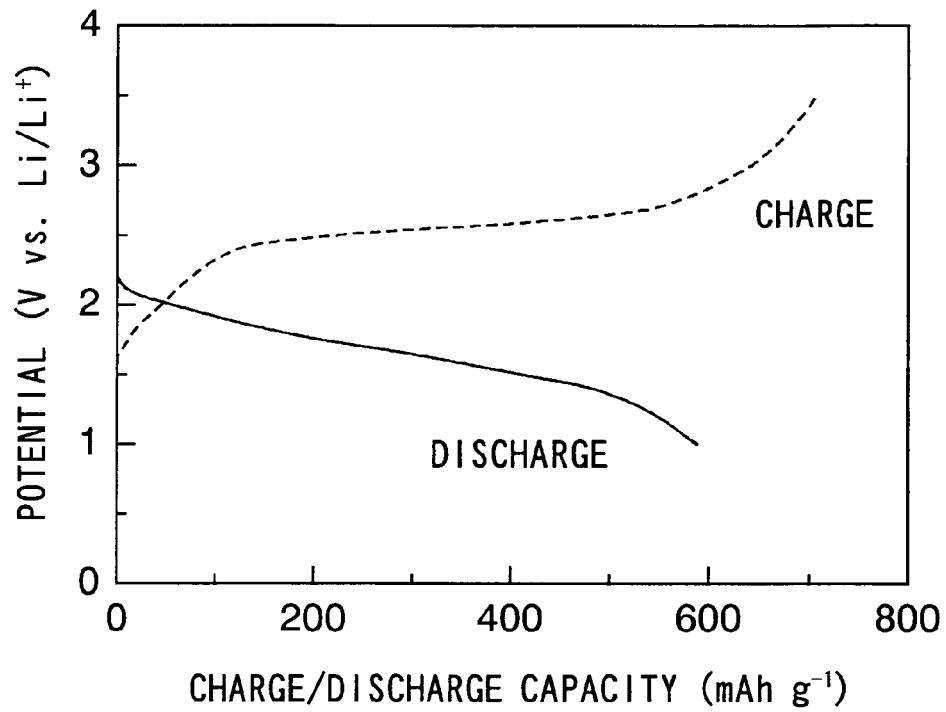
FIG. 17 is a graph representing initial charge/discharge characteristics of the test cell of Example 8.

The test cell of Example 8 was subject to the discharge at discharging current of 0.13 mA/cm$^2$ to the discharge cut-off potential of 1.0V (vs.Li/Li$^+$) and the charge at charging current of 0.13 mA/cm$^2$ to the charge cut-off potential of 3.5V (vs.Li/Li$^+$), so as to inspect the initial charge/discharge characteristics thereof. The results are shown in FIG. 17. The discharge curve showing the relation between the potential in the discharge and the capacity density per gram of sulfur is represented by the solid line, whereas the charge curve showing the relation between the potential in the charge and the capacity density per gram of sulfur is represented by the broken line.

As a result, in the test cell of Example 8, the initial discharge capacity density per gram of sulfur was 588 mAh/g, which was extremely higher than that of $LiCoO_2$ which has been generally used in the positive electrode.

REFERENCE EXAMPLE 2

Reference example 2 used the positive electrode prepared as follows. 90 parts by weight of copper sulfide CuS, 5 parts by weight of acetylene black as the conductive agent, and 5 parts by weight of polytetrafluoro ethylene as the binder were kneaded, then the resultant mixture was stirred in the mortar for 30 minutes, and was subject to the pressure of 150 kg/cm$^2$ for 5 seconds in the molding die to be formed into the disk with the diameter of 10.3 mm. The disk was covered with the aluminum net. Except for the above, the same procedure as that in Example 1 was taken to fabricate a test cell of reference example 2.

Figure 18:
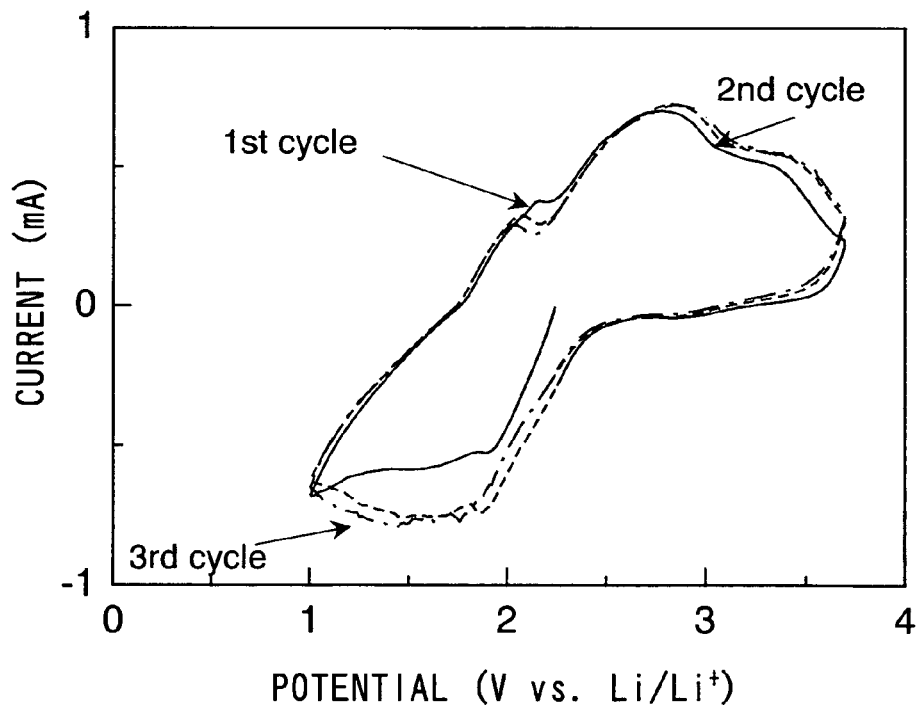
FIG. 18 is a graph representing cyclic voltammetry of a positive electrode measured by scanning potential of the positive electrode of the test cell of reference example 2.

In addition, the cyclic volutammetry of the test cell of reference example 2 was determined as follows. The potential scanning range of the positive electrode 11 versus the reference electrode 13 was set to be in the range of 1 to 3.7 V (vs.Li/Li$^+$), while potential scanning rate was set to be 1.0 mV/s. Then the operation comprising steps of scanning the initial potential of the positive electrode 11, 2.3 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 18.

As a result, in the test cell of reference example 2, in the scanning in the reduction direction, the reduction current began to flow around less than 2.3 V (vs.Li/Li$^+$), and copper sulfide was expectedly reduced. In the scanning in the oxidation direction, the oxidation peak existed around 2.8 V (vs.Li/Li$^+$), and the reduced copper sulfide was expectedly oxidized around said potential. The same results were attained also from the second cycle and onwards, and it is believed that copper sulfide reversibly reacted.

Figure 19:
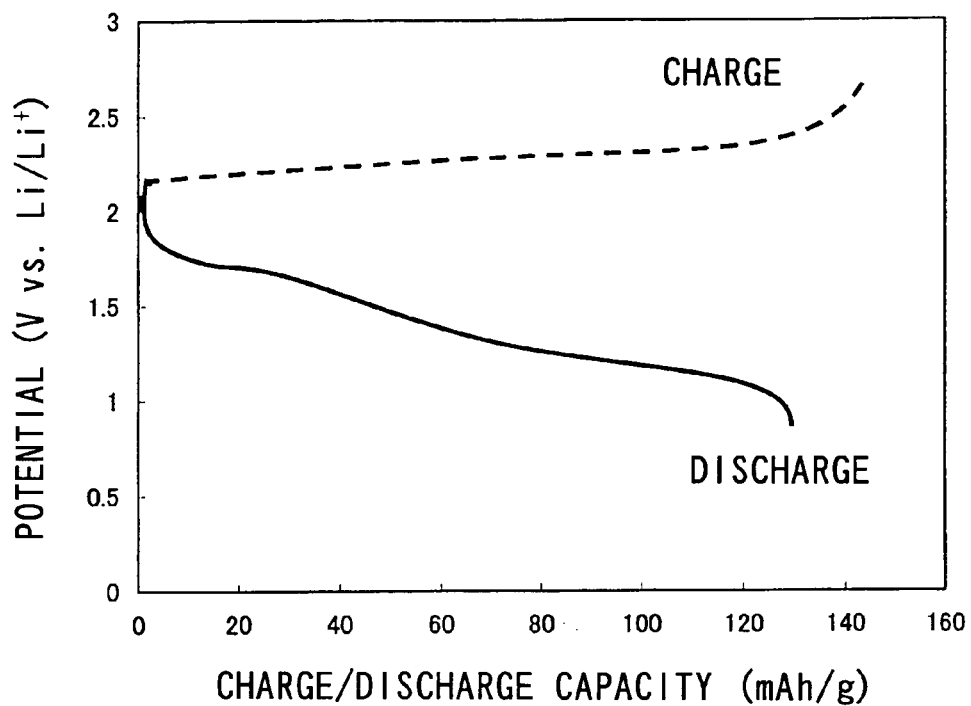
FIG. 19 is a graph representing initial charge/discharge characteristics of the test cell of reference example 2.

The test cell of reference example 2 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 2.7 V (vs.Li/Li$^+$), so as to inspect the initial charge/discharge characteristics thereof. The results are shown in FIG. 19. The discharge curve showing the relation between the potential in the discharge and the capacity density per gram of copper sulfide is represented by the solid line, whereas the charge curve showing the relation between the potential in the charge and the capacity density per gram of copper sulfide is represented by the broken line.

As a result, in the test cell of reference example 2, the initial discharge capacity density per gram of copper sulfide was 129 mAh/g.

EXAMPLE 10

Example 10 used the non-aqueous electrolyte solution prepared by dissolving 0.5 mol/l of $LiN(CF_3SO_2)_2$ as the lithium salt in the mixture containing 50% by volume of 1,3-dioxolane and 50% by volume of trimethylpropylammonium.bis(trifluoromethylsulfonyl)imide$(CH_3)_3N^+(C_3H_7)N^-(SO_2CF_3)_2$. Except for the above, the same procedure as that in Example 1 was taken to fabricate a test cell of Example 10.

Figure 20:
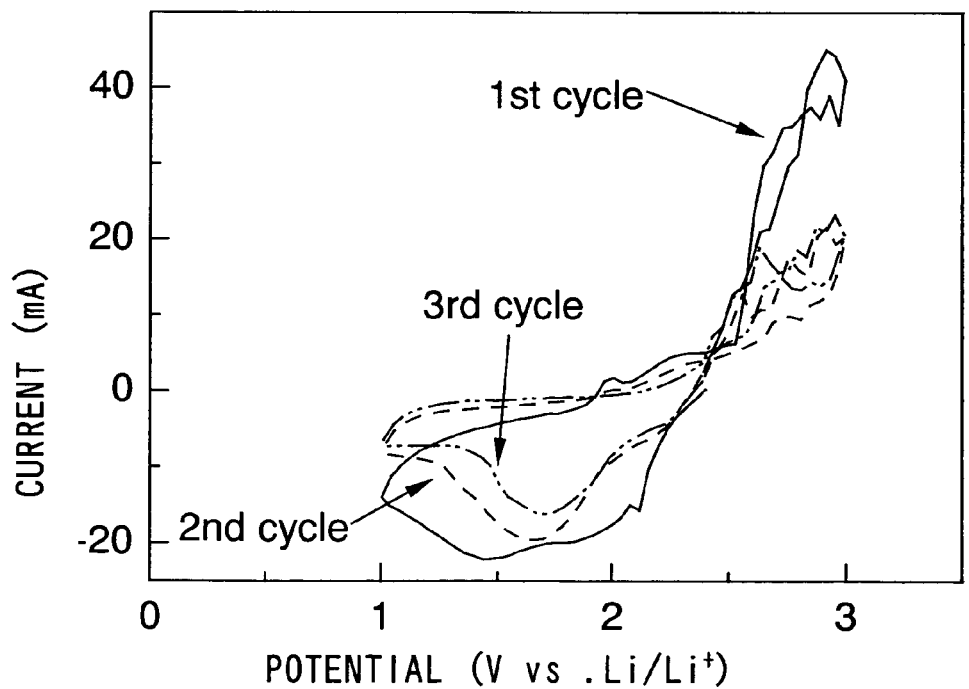
FIG. 20 is a graph representing cyclic voltammetry of a positive electrode measured by scanning potential of the positive electrode of the test cell of Example 10.

In addition, the cyclic volutammetry of the test cell of Example 10 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.4 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 20.

As a result, in the test cell of Example 10, in the scanning in the reduction direction, the reduction current began to flow around less than 2.3 V (vs.Li/Li$^+$), and sulfur was expectedly reduced. In the scanning in the oxidation direction, the oxidation peak existed around 2.6V (vs.Li/Li$^+$), and the reduced sulfur was expectedly oxidized around said potential. The same results are attained also from the second cycle and onwards, and it is believed that sulfur reversibly reacted.

Figure 21:
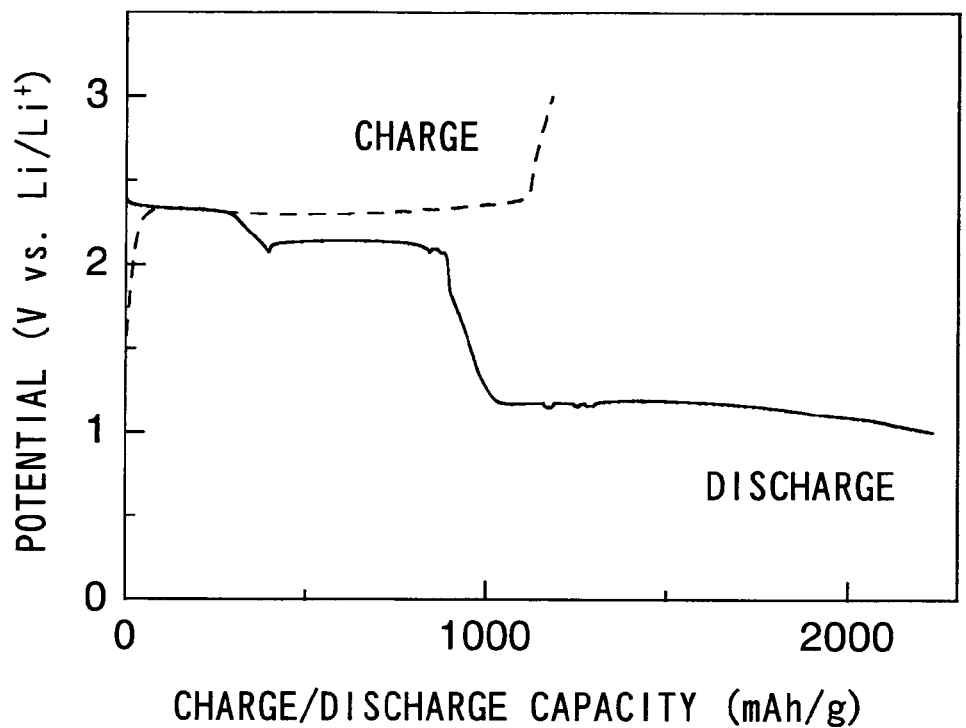
FIG. 21 is a graph representing initial charge/discharge characteristics of the test cell of Example 10.

The test cell of Example 10 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 3.0V (vs.Li/Li$^+$), so as to inspect the initial charge/discharge characteristics thereof. The results are shown in FIG. 21. The discharge curve showing the relation between the potential in the discharge and the capacity density per gram of sulfur is represented by the solid line, whereas the charge curve showing the relation between the potential in the charge and the capacity density per gram of sulfur is represented by the broken line.

As a result, in the test cell of Example 10, the initial discharge capacity density per gram of sulfur was 2230 mAh/g, which was extremely higher than that of $LiCoO_2$ which has been generally used in the positive electrode. In addition, where both 1,3-dioxolane and trimethylpropylammonium.bis(trifluoromethylsulfonyl)imide$(CH_3)_3N^+(C_3H_7)N^-(SO_2CF_3)_2$ were mixed, the discharge capacity density was higher around more than 2.0 V (vs.Li/Li$^+$) compared with the case in which the non-aqueous electrolyte solution comprised only 1,3-dioxolane as the solvent thereof as shown in the following comparative example 3, and the discharge capacity density was also higher compared with the case in which the non-aqueous electrolyte solution comprised only trimethylpropylammonium.bis(trifluoromethylsulfonyl)imide$(CH_3)_3N^+(C_3H_7)N^-(SO_2CF_3)_2$ as the solvent thereof as shown in Example 1.

EXAMPLE 11

Example 11 used the non-aqueous electrolyte solution prepared by dissolving 0.5 mol/l of $LiN(CF_3SO_2)_2$ as the lithium salt in the mixture containing 25% by volume of 1,3-dioxolane and 75 by volume of trimethylpropylammonium.bis(trifluoromethylsulfonyl)imide$(CH_3)_3N^+(C_3H_7)N^-(SO_2CF_3)_2$. Except for the above, the same procedure as that in Example 1 was taken to fabricate a test cell of Example 11.

Figure 22:
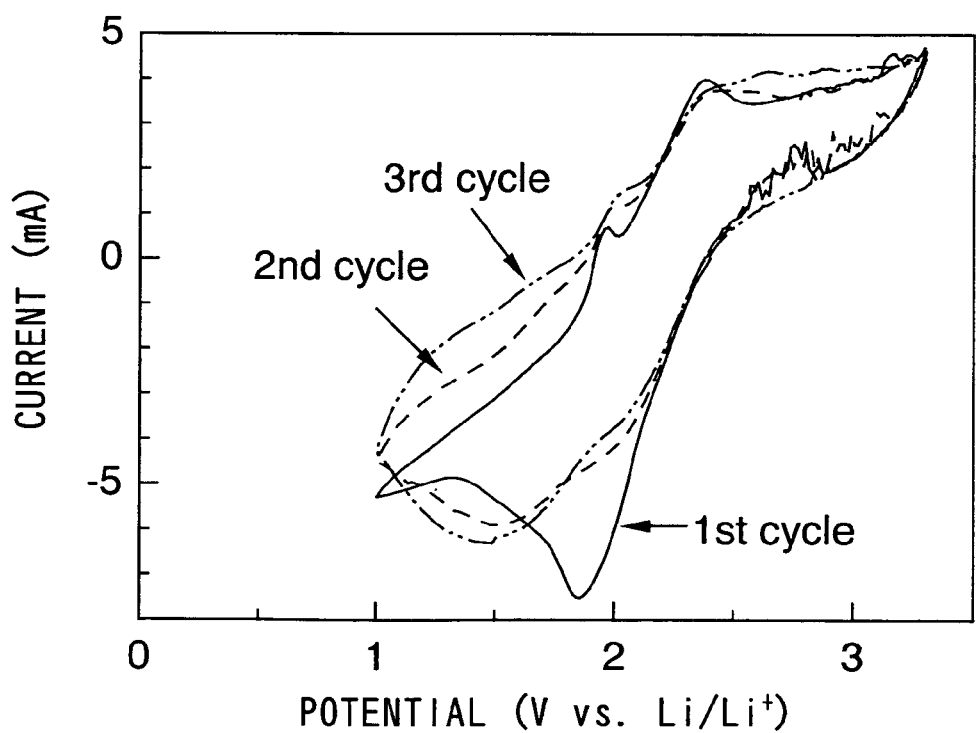
FIG. 22 is a graph representing cyclic voltammetry of a positive electrode measured by scanning potential of the positive electrode of the test cell of Example 11.

In addition, the cyclic volutammetry of the test cell of Example 11 was determined as follows. The potential scanning range of the positive electrode 11 versus the reference electrode 13 was set to be in the range of 1.0 to 3.3 V (vs.Li/Li$^+$), while the potential scanning rate was set to be 1.0 mV/s. Then the operation comprising steps of scanning the initial potential of the positive electrode 11, 2.4 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 22.

As a result, in the test cell of Example 11, in the scanning in the reduction direction, the reduction peak appeared around 1.9 V (vs.Li/Li$^+$), and sulfur was expectedly reduced. In the scanning in the oxidation direction, the oxidation peak appeared around 2.4 V (vs.Li/Li$^+$), and the reduced sulfur was expectedly oxidized around said potential. From the second cycle and onwards, in the scanning in the reduction direction, the reduction peak existed around 1.5 V (vs.Li/Li$^+$), and in the scanning in the oxidation direction, the oxidation peak existed around 2.4 V (vs.Li/Li$^+$), thus, it is believed that sulfur reversibly reacted.

Figure 23:
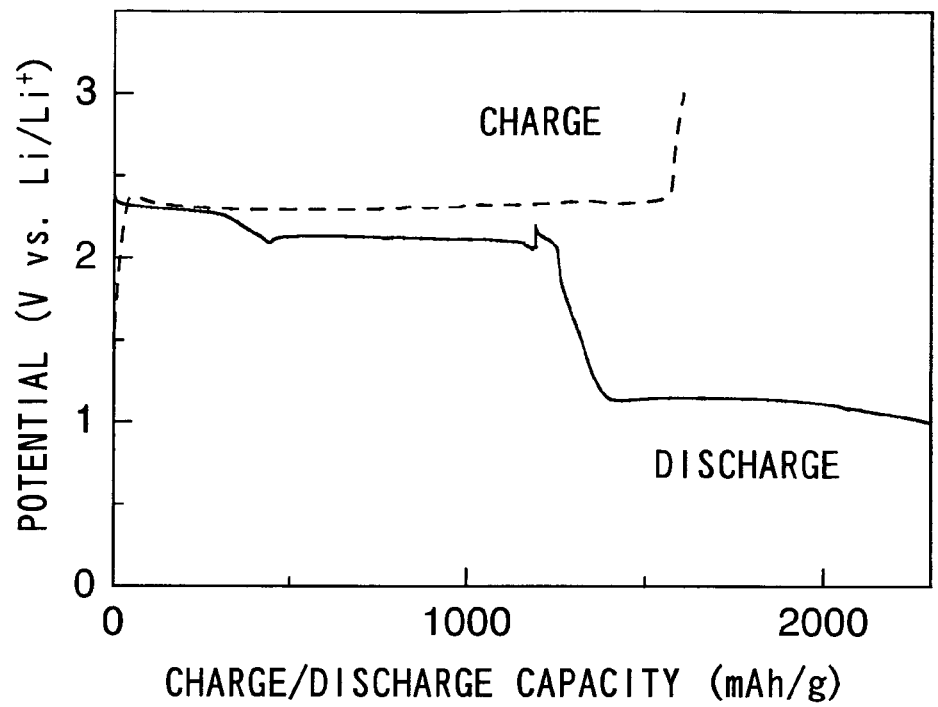
FIG. 23 is a graph representing initial charge/discharge characteristics of the test cell of Example 11.

The test cell of Example 11 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 3.0V (vs.Li/Li$^+$), so as to inspect the initial charge/discharge characteristics thereof. The results are shown in FIG. 23. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of Example 11, the initial discharge capacity density per gram of sulfur was 2291 mAh/g, which was extremely higher than that of $LiCoO_2$ which has been generally used in the positive electrode. In addition, where both 1,3-dioxolane and trimethylpropylammonium.bis(trifluoromethylsulfonyl)imide$(CH_3)_3N^+(C_3H_7)N^-(SO_2CF_3)_2$ were mixed, the discharge capacity density was higher around more than 2.0 V (vs.Li/Li$^+$) compared with the case in which the non-aqueous electrolyte solution comprised only 1,3-dioxolane as the solvent thereof as shown in the following comparative example 3, and the discharge capacity density was also higher compared with the case in which the non-aqueous electrolyte solution comprised only trimethylpropylammonium.bis(trifluoromethylsulfonyl)imide$(CH_3)_3N^+(C_3H_7)N^-(SO_2CF_3)_2$ as the solvent thereof as shown in Example 1.

COMPARATIVE EXAMPLE 3

Comparative example 3 used the non-aqueous electrolyte solution prepared by dissolving 0.5 mol/l of $LiN(CF_3SO_2)_2$ as the lithium salt in 1,3-dioxolane. Except for the above, the same procedure as that in Example 1 was taken to fabricate a test cell of comparative example 3.

Figure 24:
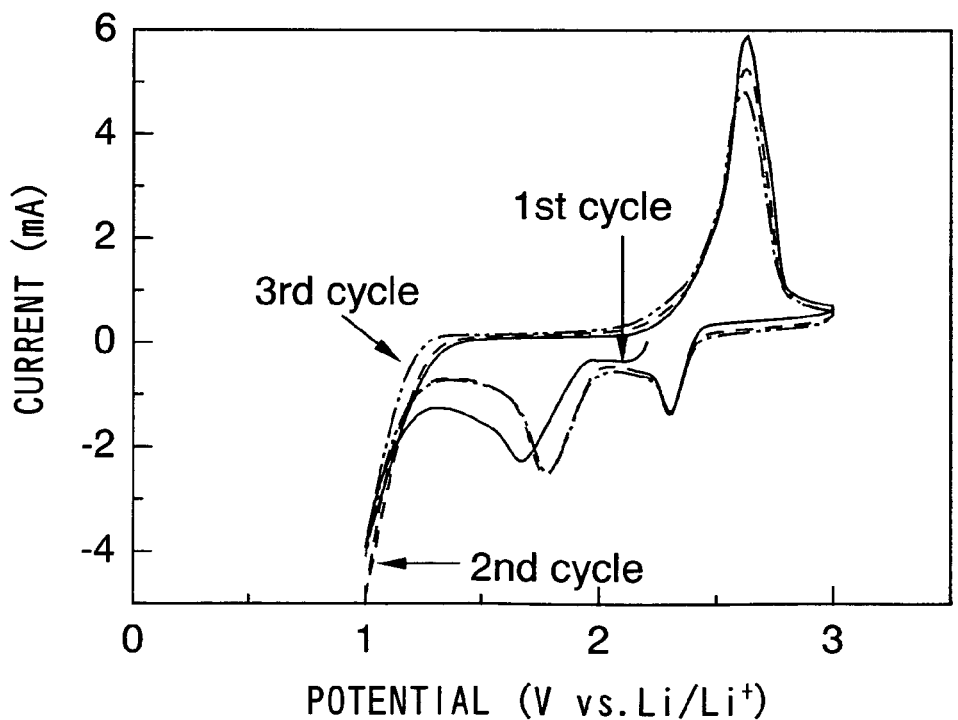
FIG. 24 is a graph representing cyclic voltammetry of a positive electrode measured by scanning potential of the positive electrode of the test cell of comparative example 3.
Figure 2:
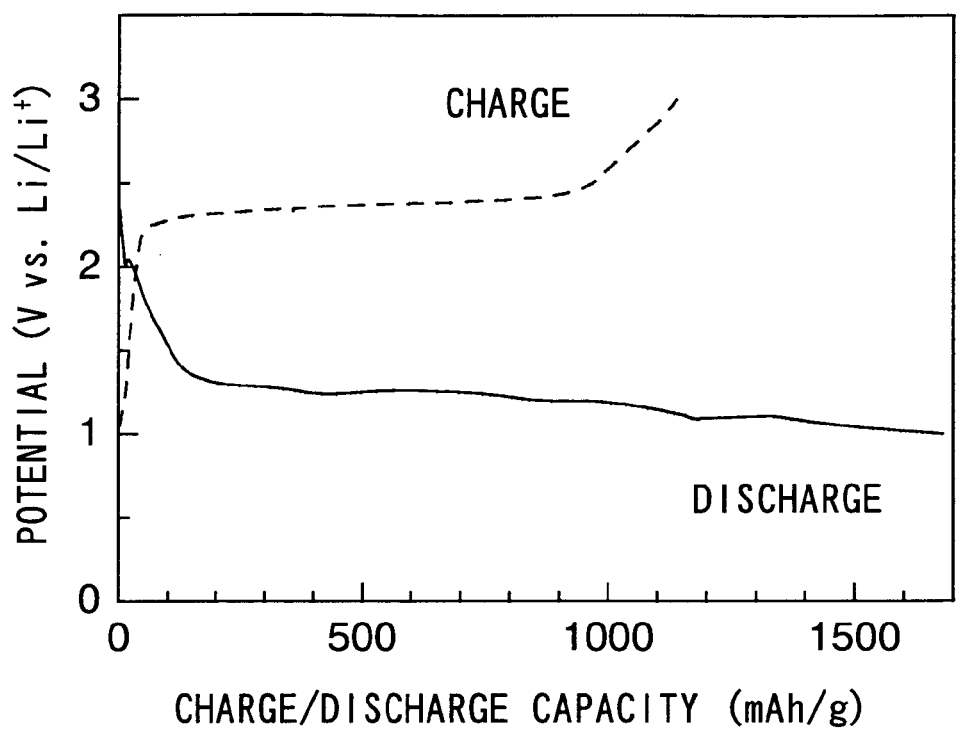
Figure 2:
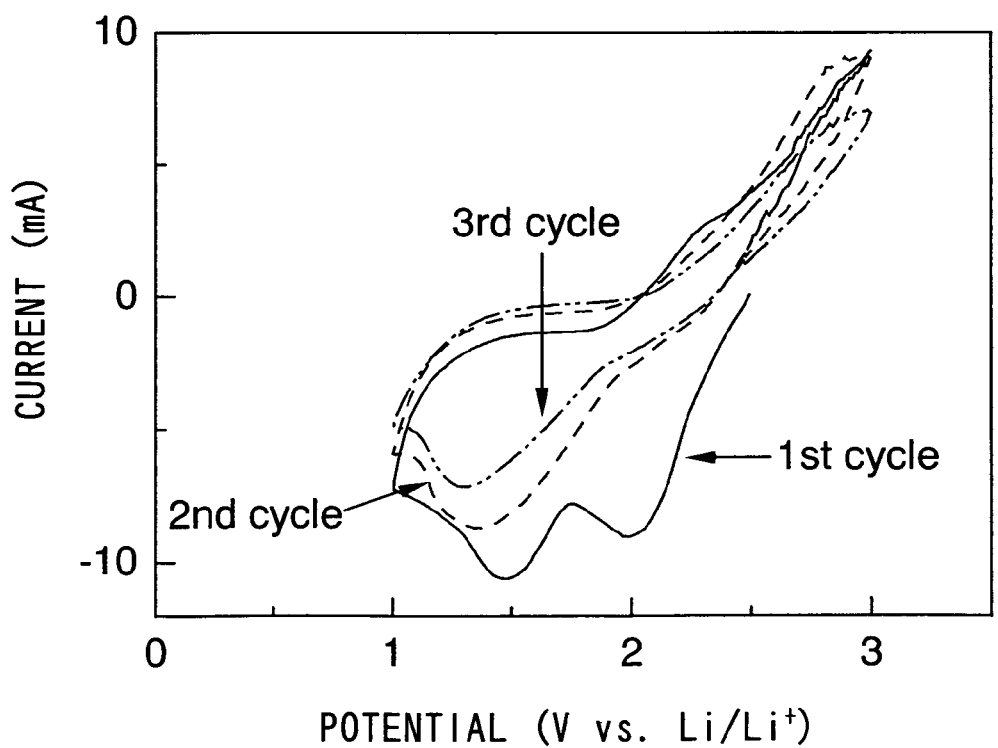

In addition, the cyclic volutammetry of the test cell of comparative example 3 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.2 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 24.

As a result, in the test cell of comparative example 3, in the scanning in the reduction direction, the reduction peak appeared around 1.8 V (vs. Li/Li$^+$) and the high reduction current began to flow around less than 1.2 V (vs.Li/Li$^+$), and sulfur was expectedly reduced. In the scanning in the oxidation direction, the oxidation peak existed around 2.6 V (vs.Li/Li$^+$), and the reduced sulfur was expectedly oxidized around said potential.

The test cell of comparative example 3 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 3.0 V (vs.Li/Li$^+$), so as to inspect the initial charge/discharge characteristics thereof. The results are shown in FIG. 25. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of comparative example 3, the initial discharge capacity density per gram of sulfur was 1677 mAh/g, which was extremely higher than that of $LiCoO_2$ which has been generally used in the positive electrode, however, the discharge potential thereof was so low as about 1.2 V (vs.Li/Li$^+$).

Example 10 and Example 11 show that where trimethylpropylammonium.bis(trifluoromethylsulfonyl)imide$(CH_3)_3N^+(C_3H_7)N^-(SO_2CF_3)_2$ and 1,3-dioxolane were mixed together, viscosity of the non-aqueous electrolyte solution was less, which was more preferable compared with the case in which only trimethylpropylammonium.bis(trifluoromethylsulfonyl)imide$(CH_3)_3N^+(C_3H_7)N^-(SO_2CF_3)_2$ was used.

Further, the results of Example 1, Example 10, Example 11, and comparative example 3 show that where the positive electrode comprised sulfur, the use of the mixture of trimethylpropylammonium.bis(trifluoromethylsulfonyl)imide $(CH_3)_3N^+(C_3H_7)N^-(SO_2CF_3)_2$ and 1,3-dioxolane was more preferable than the sole use of trimethylpropylammonium.bis(trifluoromethylsulfonyl)imide$(CH_3)_3N^+(C_3H_7)N^-(SO_2CF_3)_2$ or 1,3-dioxolane, according to comparison of each discharge capacity density around more than 2 V (vs.Li/Li$^+$) in the discharge. The amount of 1,3-dioxolane therein is generally set in a range of 0.1 to 99.9% by volume, preferably in the range of 0.1 to 50% by volume, and more preferably in the range of 0.1 to 25% by volume.

EXAMPLE 12

Example 12 used the non-aqueous electrolyte solution prepared by dissolving 0.5 mol/l of LiN(CF$_3$SO$_2$)$_2$ as the lithium salt in the mixture containing 50% by volume of tetrahydrofuran and 50% by volume of trimethylpropylammonium.bis(trifluoromethylsulfonyl)imide$(CH_3)_3N^+(C_3H_7)N^-(SO_2CF_3)_2$. Except for the above, the same procedure as that in Example 1 was taken to fabricate a test cell of Example 12.

In addition, the cyclic volutammetry of the test cell of Example 12 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.5 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 26.

As a result, in the test cell of Example 12, in the scanning in the reduction direction, the reduction peak appeared both around 2.0 V (vs.Li/Li$^+$) and 1.5 V (vs.Li/Li$^+$), and sulfur was expectedly reduced. In the scanning in the oxidation direction, the oxidation current flew around more than 2.2 V (vs.Li/Li$^+$), and the reduced sulfur was expectedly oxidized more than said potential.

Figure 27:
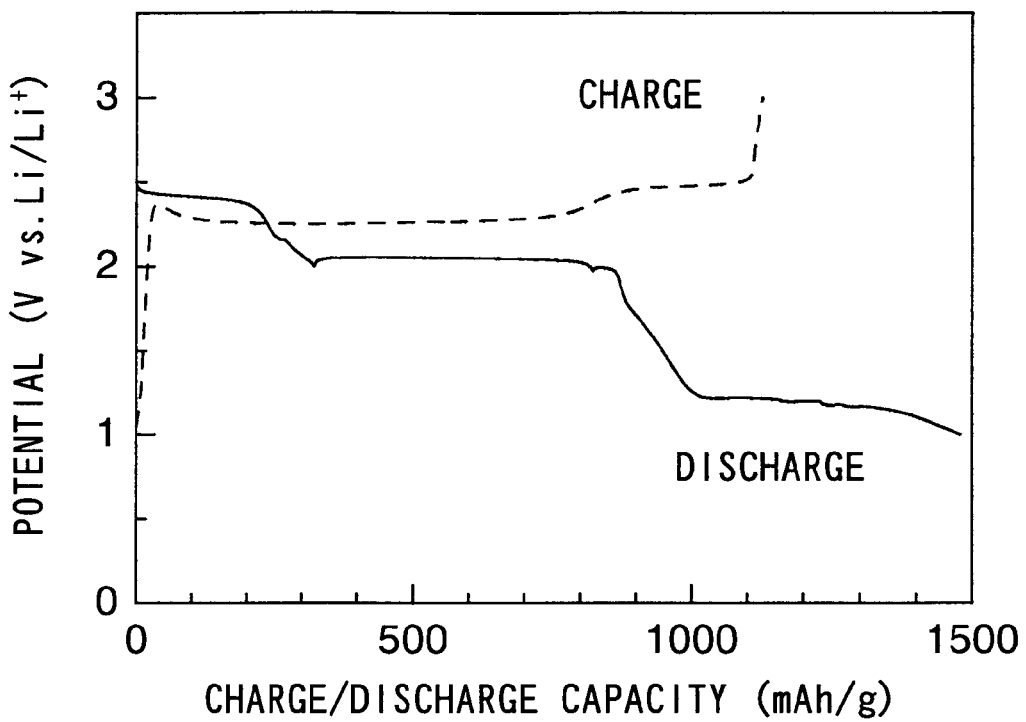
FIG. 27 is a graph representing initial charge/discharge characteristics of the test cell of Example 12.

The test cell of Example 12 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 3.0 V (vs.Li/Li$^+$), so as to inspect the initial charge/discharge characteristics thereof. The results are shown in FIG. 27. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of Example 12, the initial discharge capacity density per gram of sulfur was 1479 mAh/g, which was extremely higher than that of LiCoO$_2$ which has been generally used in the positive electrode. In addition, where both tetrahydrofuran and trimethylpropylammonium.bis(trifluoromethylsulfonyl)imide$(CH_3)_3N^+(C_3H_7)N^-(SO_2CF_3)_2$ were mixed, the discharge capacity density was higher around more than 2.0 V (vs.Li/Li$^+$) compared with the case in which the non-aqueous electrolyte solution comprised only tetrahydrofuran as the solvent thereof as shown in the following comparative example 4, and the discharge capacity density was also higher compared with the case in which the non-aqueous electrolyte solution comprised only trimethylpropylammonium.bis(trifluoromethylsulfonyl)imide$(CH_3)_3N^+(C_3H_7)N^-(SO_2CF_3)_2$ as the solvent thereof as shown in Example 1.

EXAMPLE 13

Example 13 used the non-aqueous electrolyte solution prepared by dissolving 0.5 mol/l of LiN(CF$_3$SO$_2$) as the lithium salt in the mixture containing 25% by volume of tetrahydrofuran and 75 by volume of trimethylpropylammonium.bis(trifluoromethylsulfonyl)imide$(CH_3)_3N^+(C_3H_7)N^-(SO_2CF_3)_2$. Except for the above, the same procedure as that in Example 1 was taken to fabricate a test cell of Example 13.

Figure 28:
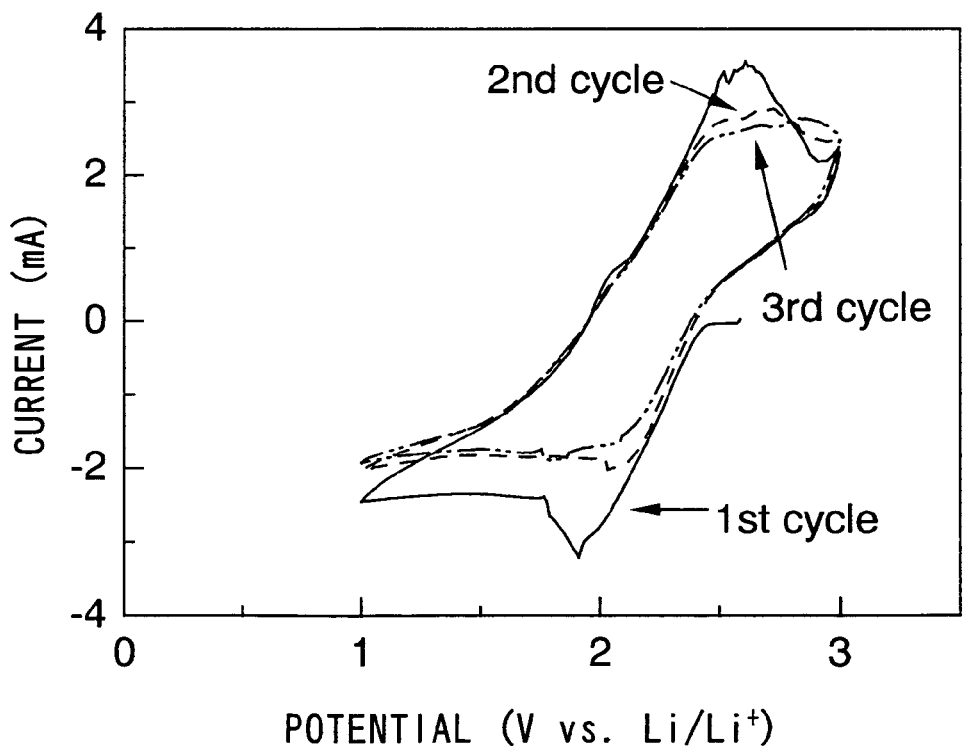
FIG. 28 is a graph representing cyclic voltammetry of a positive electrode measured by scanning potential of the positive electrode of the test cell of Example 13.

In addition, the cyclic volutammetry of the test cell of Example 13 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.6 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 28.

As a result, in the test cell of Example 13, in the scanning in the reduction direction, the reduction current flew around less than 2.4 V (vs.Li/Li$^+$), and sulfur was expectedly reduced. In the scanning in the oxidation direction, the oxidation peak appeared around 2.5 V (vs.Li/Li$^+$), and the reduced sulfur was expectedly oxidized around said potential.

Figure 29:
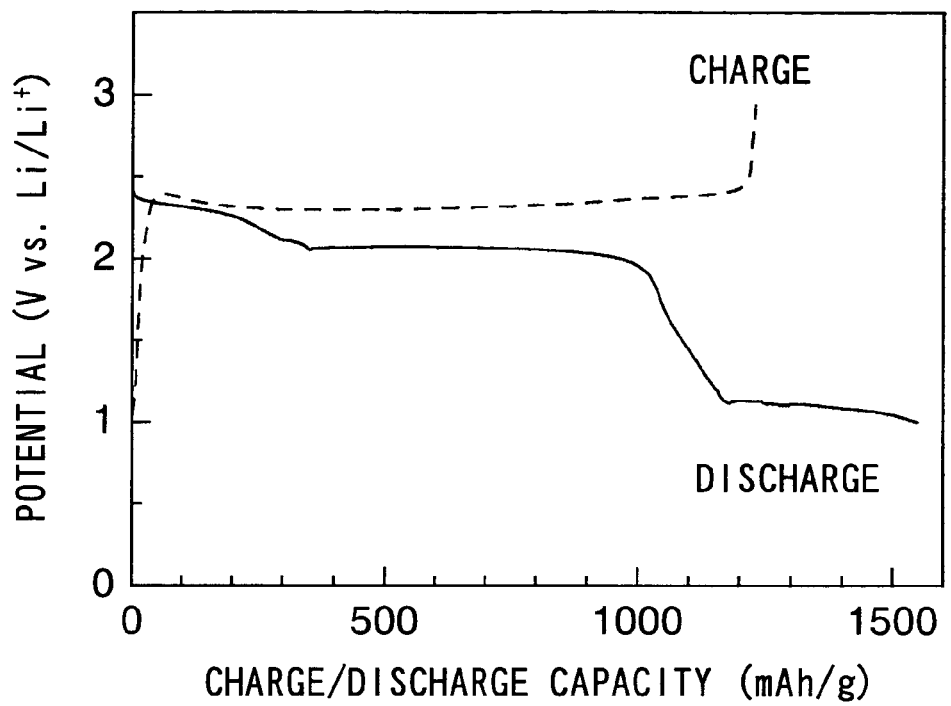
FIG. 29 is a graph representing initial charge/discharge characteristics of the test cell of Example 13.

The test cell of Example 13 was subject to the discharge at discharging current of 0.13 mA/cm$^2$ to the discharge cut-off potential of 1.0 V (vs. Li/Li$^+$) and the charge at charging current of 0.13 mA/cm$^2$ to the charge cut-off potential of 3.0 V (vs.Li/Li$^+$), so as to inspect the initial charge/discharge characteristics thereof. The results are shown in FIG. 29. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of Example 13, the initial discharge capacity density per gram of sulfur was 1547 mAh/g, which was extremely higher than that of LiCoO$_2$ which has been generally used in the positive electrode. In addition, where both tetrahydrofuran and trimethylpropylammonium.bis(trifluoromethylsulfonyl)imide$(CH_3)_3N^+(C_3H_7)N^-(SO_2CF_3)_2$ were mixed, the discharge capacity density was higher around more than 2.0 V (vs.Li/Li$^+$) compared with the case in which the non-aqueous electrolyte solution comprised only tetrahydrofuran as the solvent thereof as shown in the following comparative example 4, and the discharge capacity density was also higher compared with the case in which the non-aqueous electrolyte solution comprised only trimethylpropylammonium.bis(trifluoromethylsulfonyl)imide$(CH_3)_3N^+(C_3H_7)N^-(SO_2CF_3)_2$ as the solvent thereof as shown in Example 1.

COMPARATIVE EXAMPLE 4

Comparative example 4 used the non-aqueous electrolyte solution prepared by dissolving 0.5 mol/l of LiN(CF$_3$SO$_2$)$_2$ as the lithium salt in tetrahydrofuran. Except for the above, the same procedure as that in Example 1 was taken to fabricate a test cell of comparative example 4.

Figure 30:
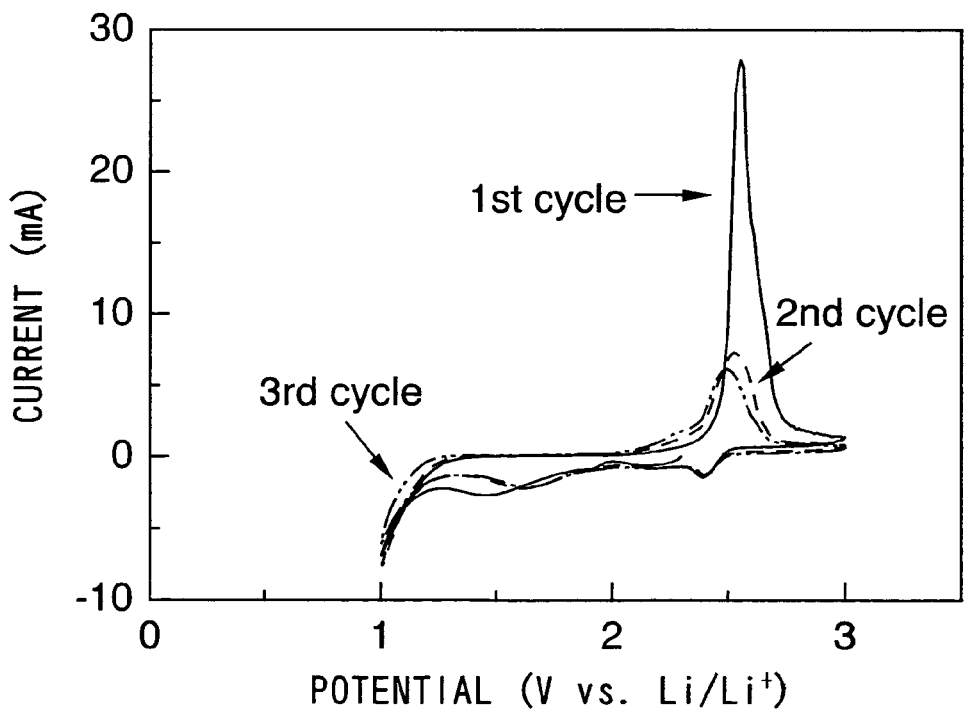
FIG. 30 is a graph representing cyclic voltammetry of a positive electrode measured by scanning potential of the positive electrode of the test cell of comparative example 4.

In addition, the cyclic volutammetry of the test cell of comparative example 4 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.3 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 30.

As a result, in the test cell of comparative example 4, in the scanning in the reduction direction, the reduction peak appeared around 1.6 V (vs.Li/Li$^+$) and the high reduction current flew around less than 1.2 V (vs.Li/Li$^+$), thus sulfur was expectedly reduced. In the scanning in the oxidation direction, the oxidation peak appeared around 2.5 V (vs.Li/Li$^+$), and the reduced sulfur was expectedly oxidized around said potential.

Figure 31:
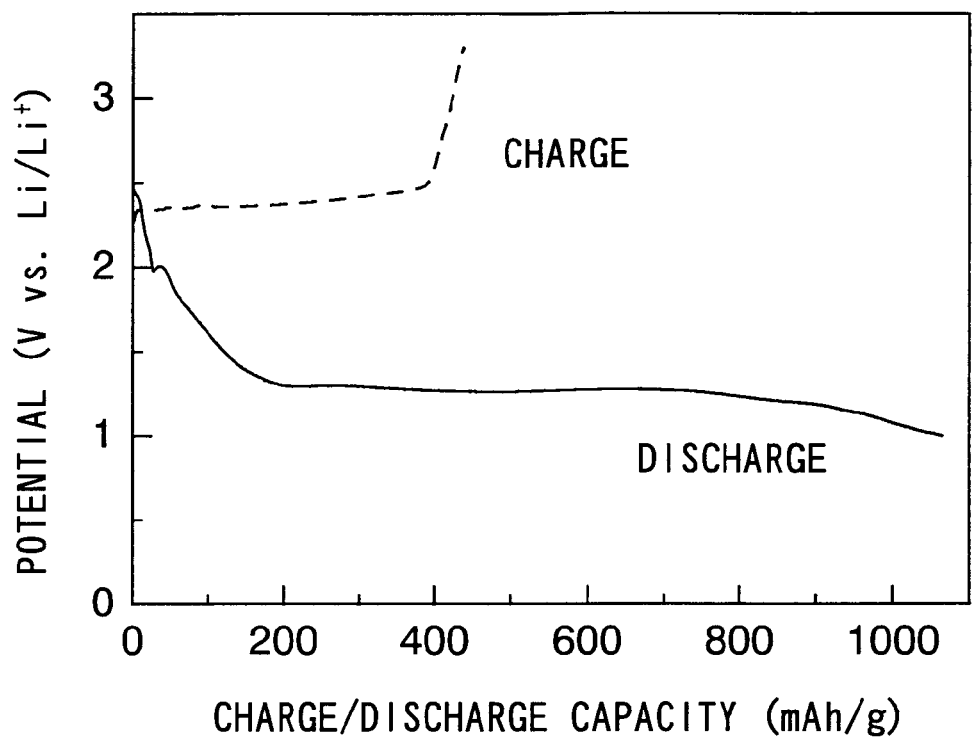
FIG. 31 is a graph representing initial charge/discharge characteristics of the test cell of comparative example 4.

The test cell of comparative example 4 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 3.3 V (vs.Li/Li$^+$), so as to inspect the initial charge/discharge characteristics thereof. The results are shown in FIG. 31. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of comparative example 4, the initial discharge capacity density per gram of sulfur was 1065 mAh/g which was extremely higher than that of LiCoO$_2$ which has been generally used in the positive electrode, but the discharge potential thereof was so low as about 1.2V (vs.Li/Li$^+$).

Example 12 and Example 13 show that where trimethylpropylammonium.bis(trifluoromethylsulfonyl)imide(CH$_3$)$_3$N$^+$(C$_3$H$_7$)N$^-$(SO$_2$CF$_3$)$_2$ and tetrahydrofuran were mixed together, the viscosity of the non-aqueous electrolyte solution was less, which was more preferable compared with the cases in which only trimethylpropylammonium.bis(trifluoromethylsulfonyl)imide(CH$_3$)$_3$N$^+$(C$_3$H$_7$)N$^-$(SO$_2$CF$_3$)$_2$ was used. Further, the results of Example 1, Example 12, Example 13, and comparative example 4 show that where the positive electrode comprised sulfur, the use of the mixture of trimethylpropylammonium.bis(trifluoromethylsulfonyl)imide (CH$_3$)$_3$N$^+$(C$_3$H$_7$)N$^-$(SO$_2$CF$_3$)$_2$ and tetrahydrofuran is more preferable than the sole use of trimethylpropylammonium.bis(trifluoromethylsulfonyl)imide(CH$_3$)$_3$N$^+$(C$_3$H$_7$)N$^-$(SO$_2$CF$_3$)$_2$ or tetrahydrofuran, according to the comparison of each discharge capacity density around more than 2 V (vs.Li/Li$^+$) in the discharge. The amount of tetrahydrofuran therein is generally set in the range of 0.1 to 99.9% by volume, preferably in the range of 0.1 to 50% by volume, and more preferably in the range of 0.1 to 25% by volume.

EXAMPLE 14

Example 14 used the non-aqueous electrolyte solution prepared by dissolving 0.5 mol/l of LiN(CF$_3$SO$_2$)$_2$ as the lithium salt in the mixture containing 50% by volume of 1,2-dimethoxyethane and 50% by volume of trimethylpropylammonium.bis(trifluoromethylsulfonyl)imide(CH$_3$)$_3$N$^+$(C$_3$H$_7$)N$^-$(SO$_2$CF$_3$)$_2$. Except for the above, the same procedure as that in Example 1 was taken to fabricate a test cell of Example 14.

Figure 32:
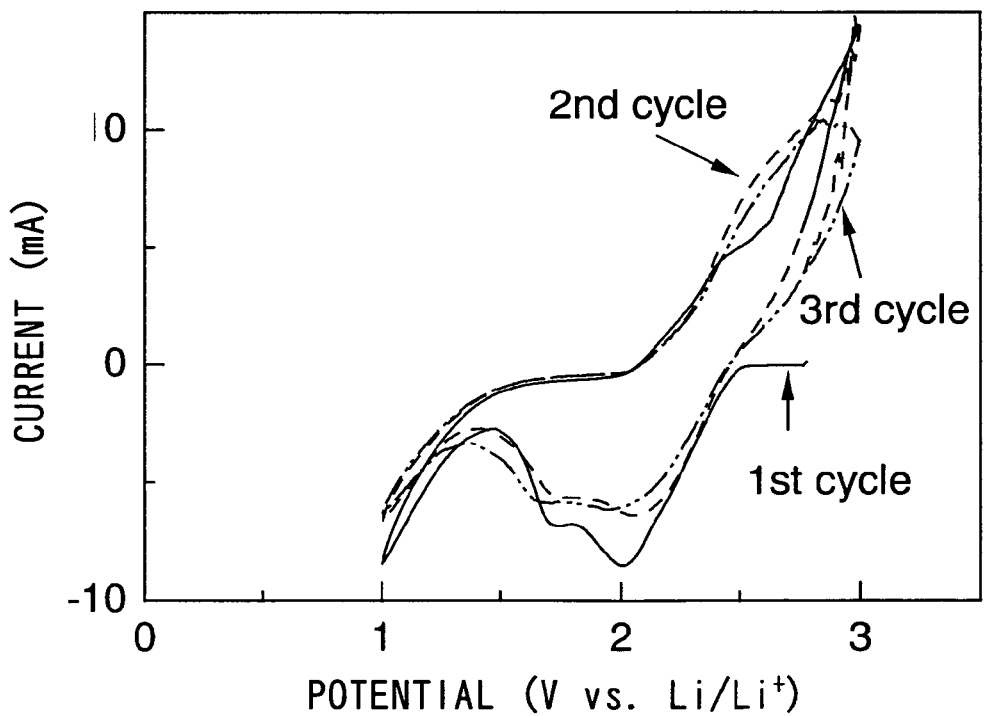
FIG. 32 is a graph representing cyclic voltammetry of a positive electrode measured by scanning potential of the positive electrode of the test cell of Example 14.

In addition, the cyclic volutammetry of the test cell of Example 14 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.8 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 32.

As a result, in the test cell of Example 14, in the scanning in the reduction direction, the reduction peak appeared around 2.0 V (vs.Li/Li$^+$), and sulfur was expectedly reduced. In the scanning in the oxidation direction, the oxidation current flew around more than 2.2 V (vs.Li/Li$^+$), and the reduced sulfur was expectedly oxidized more than said potential.

Figure 33:
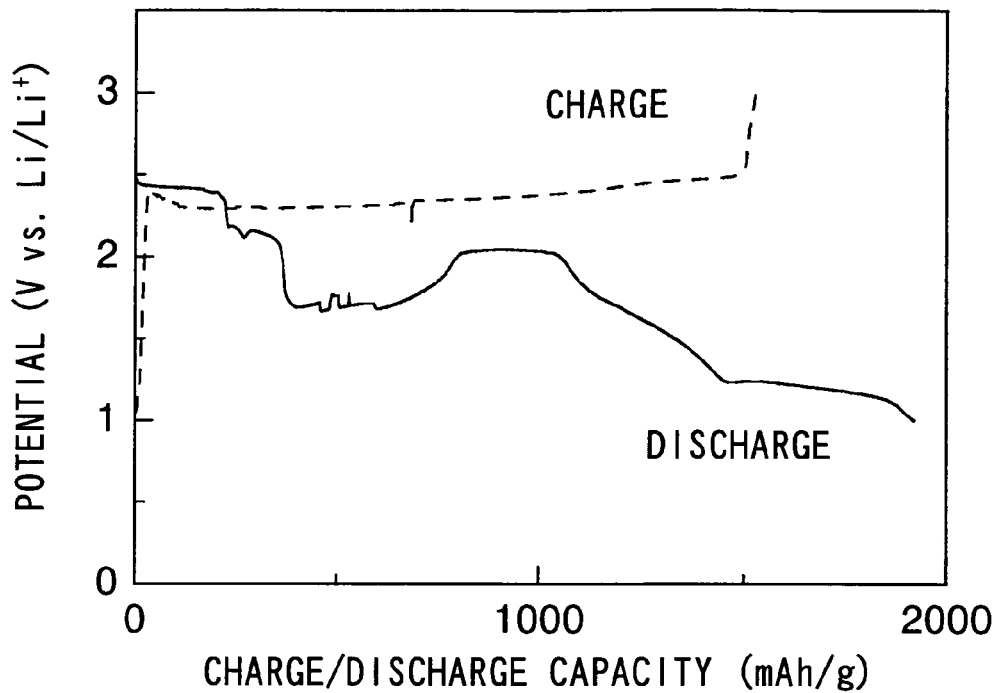
FIG. 33 is a graph representing initial charge/discharge characteristics of the test cell of Example 14.

The test cell of Example 14 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 3.0V (vs.Li/Li$^+$), so as to inspect the initial charge/discharge characteristics thereof. The results are shown in FIG. 33. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of Example 14, the initial discharge capacity density per gram of sulfur was 1919 mAh/g, which is extremely higher than that of LiCoO$_2$ which has been generally used in the positive electrode. In addition, where both 1,2-dimethoxyethane and trimethylpropylammonium.bis(trifluoromethylsulfonyl)imide(CH$_3$)$_3$N$^+$(C$_3$H$_7$)N$^-$(SO$_2$CF$_3$)$_2$ were mixed, the discharge capacity density was higher around more than 1.5 V (vs.Li/Li$^+$) compared with the case in which the non-aqueous electrolyte solution comprised only 1,2-dimethoxyethane as the solvent thereof as shown in the following comparative example 5, and the discharge capacity density was also higher compared with the case in which the non-aqueous electrolyte solution comprised only trimethylpropylammonium.bis(trifluoromethylsulfonyl)imide(CH$_3$)$_3$N$^+$(C$_3$H$_7$)N$^-$(SO$_2$CF$_3$)$_2$ as the solvent thereof as shown in Example 1.

EXAMPLE 15

Example 15 used the non-aqueous electrolyte solution prepared by dissolving 0.5 mol/l of LiN(CF$_3$SO$_2$)$_2$ as the lithium salt in the mixture containing 25% by volume of 1,2-dimethoxyethane and 75% by volume of trimethylpropylammonium.bis(trifluoromethylsulfonyl)imide(CH$_3$)$_3$N$^-$(C$_3$H$_7$)N$^-$(SO$_2$CF$_3$)$_2$. Except for the above, the same procedure as that in Example 1 was taken to fabricate a test cell of Example 15.

Figure 34:
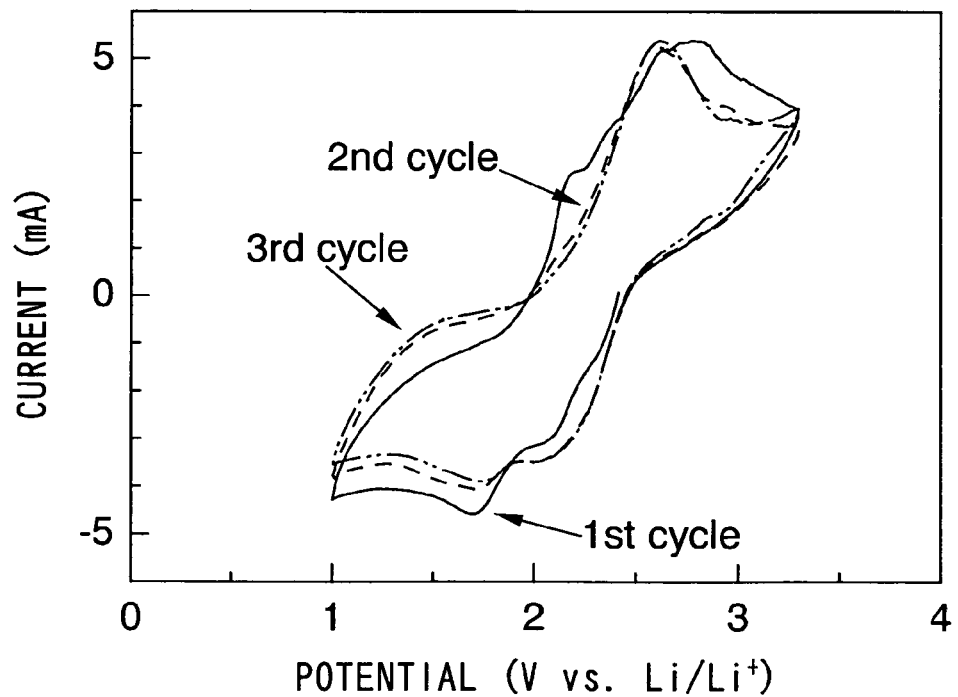
FIG. 34 is a graph representing cyclic voltammetry of a positive electrode measured by scanning potential of the positive electrode of the test cell of Example 15.

In addition, the cyclic volutammetry of the test cell of Example 15 was determined as follows. The potential scanning range of the positive electrode 11 versus the reference electrode 13 was set to be in the range of 1.0 to 3.3 V (vs.Li/Li$^+$), while the potential scanning rate was set to be 1.0 mV/s. Then the operation comprising steps of scanning the initial potential of the positive electrode 11, 2.4 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 34.

As a result, in the test cell of Example 15, in the scanning in the reduction direction, the reduction current flew around less than 2.4 V (vs.Li/Li$^+$), and sulfur was expectedly reduced. In the scanning in the oxidation direction, the oxidation peak appeared around 2.5 V (vs.Li/Li$^+$), and the reduced sulfur was expectedly oxidized around said potential.

Figure 35:
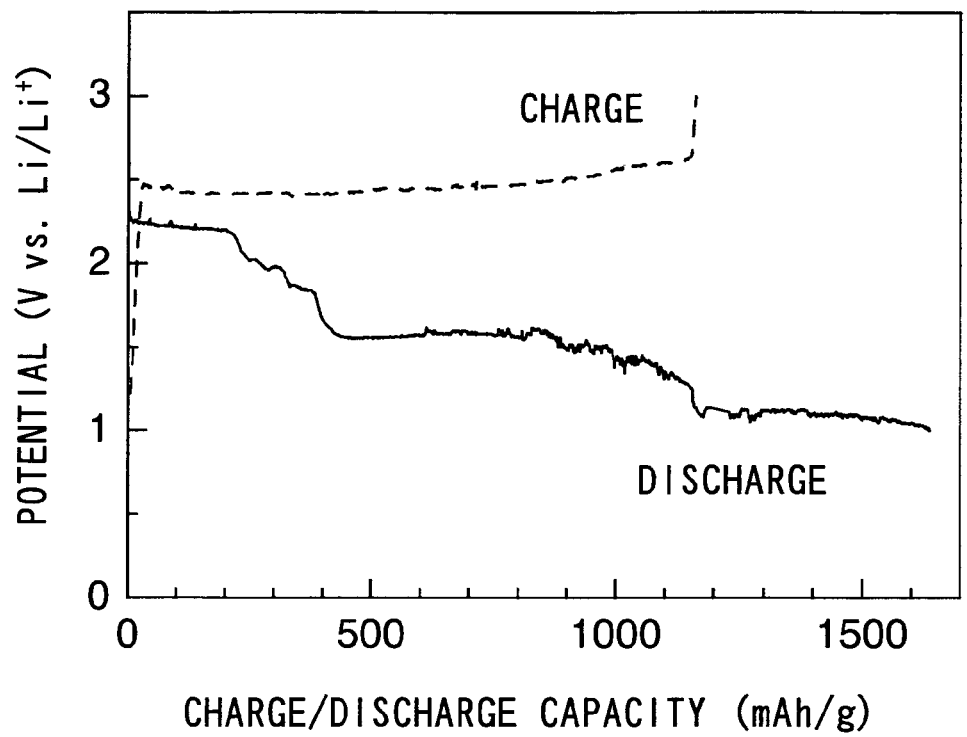
FIG. 35 is a graph representing initial charge/discharge characteristics of the test cell of Example 15.

The test cell of Example 15 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 3.0V (vs.Li/Li$^+$), so as to inspect the initial charge/discharge characteristics thereof. The results are shown in FIG. 35. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of Example 15, the initial discharge capacity density per gram of sulfur was 1636 mAh/g, which was extremely higher than that of LiCoO$_2$ which has been generally used in the positive electrode. In addition, where both 1,2-dimethoxyethane and trimethylpropylammonium.bis(trifluoromethylsulfonyl)imide(CH$_3$)$_3$N$^+$(C$_3$H$_7$)N$^-$(SO$_2$CF$_3$)$_2$ were mixed, the discharge capacity density was higher around more than 1.5 V (vs.Li/Li$^+$) compared with the case in which the non-aqueous electrolyte solution comprised only 1,2-dimethoxyethane as the solvent thereof as shown in the following comparative example 5, and the discharge capacity density was also higher compared with the case in which the non-aqueous electrolyte solution comprised only trimethylpropylammonium.bis(trifluoromethylsulfonyl)imide(CH$_3$)$_3$N$^+$(C$_3$H$_7$)N$^-$(SO$_2$CF$_3$)$_2$ as the solvent thereof as shown in Example 1.

COMPARATIVE EXAMPLE 5

Comparative example 5 used the non-aqueous electrolyte solution prepared by dissolving 0.5 mol/l of LiN(CF$_3$SO$_2$)$_2$ as the lithium salt in 1,2-dimethoxyethane. Except for the above, the same procedure as that in Example 1 was taken to fabricate a test cell of comparative example 5.

Figure 36:
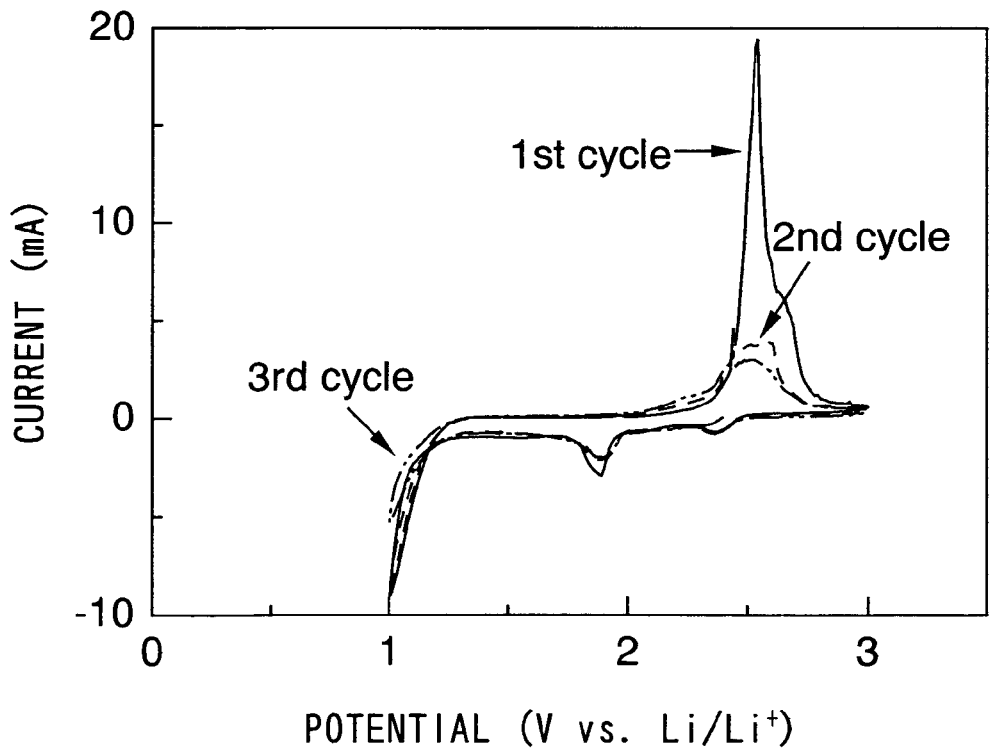
FIG. 36 is a graph representing cyclic voltammetry of a positive electrode measured by scanning potential of the positive electrode of the test cell of comparative example 5.

In addition, the cyclic volutammetry of the test cell of comparative example 5 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.4 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 36.

As a result, in the test cell of comparative example 5, in the scanning in the reduction direction, the reduction peak appeared around 1.8 V (vs.Li/Li$^+$) and the high reduction current flew around less than 1.2 V (vs.Li/Li$^+$), thus sulfur was expectedly reduced. In the scanning in the oxidation direction, the oxidation peak appeared around 2.5 V (vs.Li/Li$^+$), and the reduced sulfur was expectedly oxidized around said potential.

Figure 37:
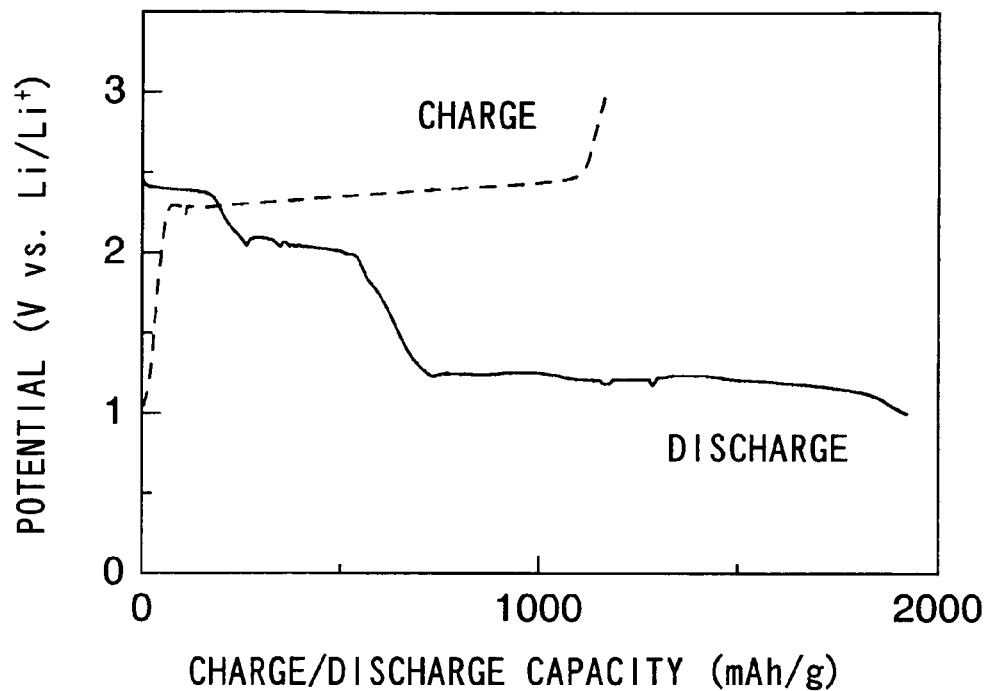
FIG. 37 is a graph representing initial charge/discharge characteristics of the test cell of comparative example 5.

The test cell of comparative example 5 was subject to the discharge at discharging current of 0.13 mA/cm$^2$ to the discharge cut-off potential of 1.0 V (vs.Li/Li$^+$) and the charge at charging current of 0.13 mA/cm$^2$ to the charge cut-off potential of 3.0 V (vs.Li/Li$^+$), so as to inspect the initial charge/discharge characteristics thereof. The results are shown in FIG. 37. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of comparative example 5, the initial discharge capacity density per gram of sulfur was 1921 mAh/g which was extremely higher than that of LiCoO$_2$ which has been generally used in the positive electrode, but in the discharge characteristics, the capacity density around more than 1.5 V (vs.Li/Li$^+$) was less, and almost all of the discharge potential was so low as about 1.2 V (vs.Li/Li$^+$).

Example 14 and Example 15 show that where trimethylpropylammonium.bis(trifluoromethylsulfonyl)imide(CH$_3$)$_3$N$^+$(C$_3$H$_7$)N$^-$(SO$_2$CF$_3$)$_2$ and 1,2-dimethoxyethane were mixed together, the viscosity of the non-aqueous electrolyte solution was less, which was more preferable compared with the cases in which only trimethylpropylammonium.bis(trifluoromethylsulfonyl)imide(CH$_3$)$_3$N$^+$(C$_3$H$_7$)N$^-$(SO$_2$CF$_3$)$_2$ was used. Further, the results of Example 1, Example 14, Example 15, and comparative example 5 show that where the positive electrode comprised sulfur, the use of the mixture of trimethylpropylammonium.bis(trifluoromethylsulfonyl)imide(CH$_3$)$_3$N$^+$(C$_3$H$_7$)N$^-$(SO$_2$CF$_3$)$_2$ and 1,2-dimethoxyethane is more preferable than the sole use of trimethylpropylammonium.bis(trifluoromethylsulfonyl)imide(CH$_3$)$_3$N$^+$(C$_3$H$_7$)N$^-$(SO$_2$CF$_3$)$_2$ or 1,2-dimethoxyethane, according to the comparison of each discharge capacity density around more than 1.5 V (vs.Li/Li$^+$) in the discharge. The amount of 1,2-dimethoxyethane therein is generally set in the range of 0.1 to 99.9% by volume, preferably in the range of 0.1 to 50% by volume, and more preferably in the range of 0.1 to 25% by volume.

EXAMPLE 16

Example 16 used the non-aqueous electrolyte solution prepared by dissolving 0.5 mol/l of LiN(CF$_3$SO$_2$)$_2$ as the lithium salt in the mixture containing 10% by volume of 1,3-dioxolane, 10% by volume of tetrahydrofuran, and 80% by volume of trimethylpropylammonium.bis(trifluoromethylsulfonyl)imide(CH$_3$)$_3$N$^+$(C$_3$H$_7$)N$^-$(SO$_2$CF$_3$)$_2$. Except for the above, the same procedure as that in Example 1 was taken to fabricate a test cell of Example 16.

Figure 38:
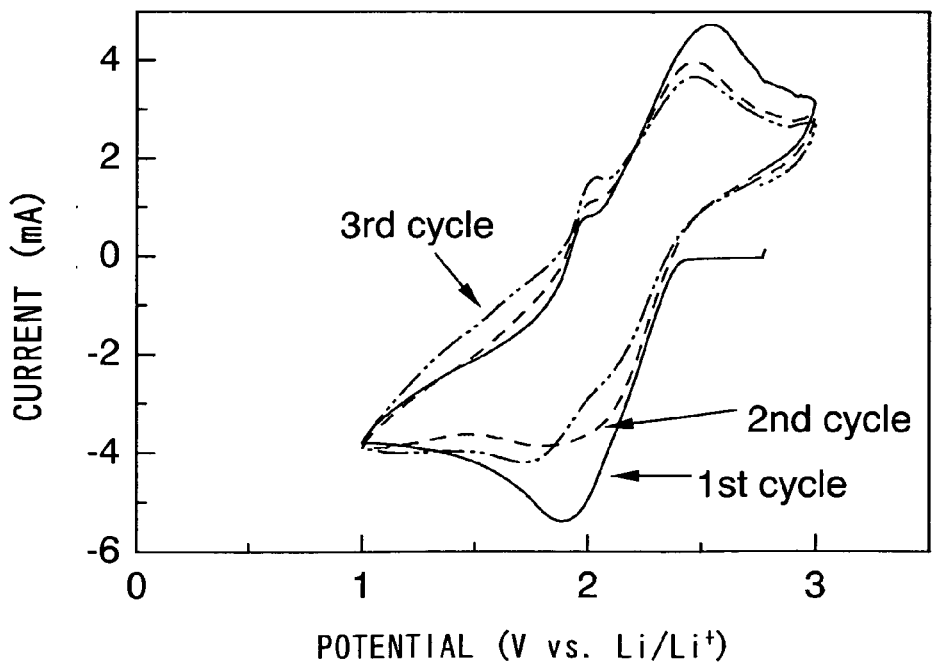
FIG. 38 is a graph representing cyclic voltammetry of a positive electrode measured by scanning potential of the positive electrode of the test cell of Example 16.

In addition, the cyclic volutammetry of the test cell of Example 16 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.8 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 38.

As a result, in the test cell of Example 16, in the scanning in the reduction direction, the reduction peak appeared around 1.9 V (vs.Li/Li$^+$), and sulfur was expectedly reduced. In the scanning in the oxidation direction, the oxidation peak appeared around 2.4 V (vs.Li/Li$^+$), and the reduced sulfur was expectedly oxidized around said potential. The same results are attained also from the second cycle and onwards, and it was proved that sulfur reversibly reacted around 2 V (vs.Li/Li$^+$).

In the mixture of 1,3-dioxolane, tetrahydrofuran, and trimethylpropylammonium.bis(trifluoromethylsulfonyl)imide (CH$_3$)$_3$N$^+$(C$_3$H$_7$)N$^-$(SO$_2$CF$_3$)$_2$, the ratio of trimethylpropylammonium.bis(trifluoromethylsulfonyl)imide therein is generally set in the range of 0.1 to 99.9% by volume, preferably in the range of 50 to 99.9% by volume, and more preferably in the range of 80 to 99.9% by volume.

EXAMPLE 17

Example 17 used the non-aqueous electrolyte solution prepared by dissolving 0.5 mol/l of $LiN(CF_3SO_2)_2$ as the lithium salt in the mixture containing 10% by volume of 1,3-dioxolane, 10% by volume of 1,2-dimethoxyethane, and 80% by volume of trimethylpropylammonium.bis(trifluoromethylsulfonyl)imide$(CH_3)_3N^+(C_3H_7)N^-(SO_2CF_3)_2$. Except for the above, the same procedure as that in Example 1 was taken to fabricate a test cell of Example 17.

Figure 39:
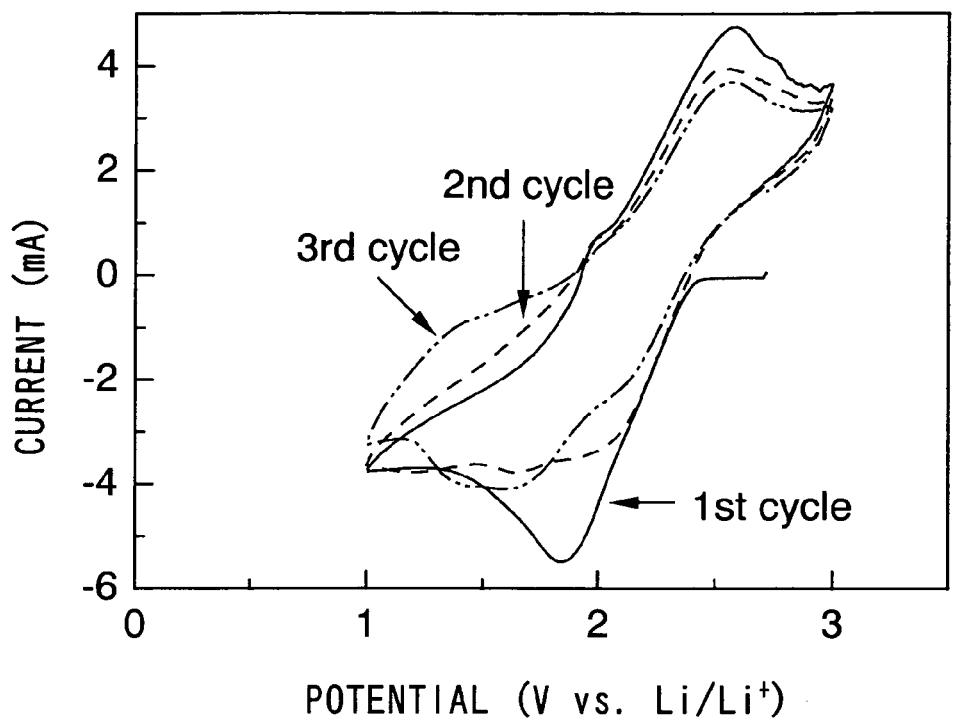
FIG. 39 is a graph representing cyclic voltammetry of a positive electrode measured by scanning potential of the positive electrode of the test cell of Example 17.

In addition, the cyclic volutammetry of the test cell of Example 17 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.7 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 39.

As a result, in the test cell of Example 17, in the scanning in the reduction direction, the reduction peak appeared around 1.9 V (vs.Li/Li$^+$), and sulfur was expectedly reduced. In the scanning in the oxidation direction, the oxidation peak appeared around 2.5 V (vs.Li/Li$^+$), and the reduced sulfur was expectedly oxidized around said potential. The same results were attained also from the second cycle and onwards, and it was proved that sulfur reversibly reacted around 2 V (vs.Li/Li$^+$).

In the mixture of 1,3-dioxolane, 1,2-dimethoxyethane, and trimethylpropylammonium.bis(trifluoromethylsulfonyl)imide$(CH_3)_3N^+(C_3H_7)N^-(SO_2CF_3)_2$, the ratio of trimethylpropylammonium.bis(trifluoromethylsulfonyl)imide therein is generally set in the range of 0.1 to 99.9% by volume, preferably in the range of 50 to 99.9% by volume, and more preferably in the range of 80 to 99.9% by volume.

EXAMPLE 18

Example 18 used the non-aqueous electrolyte solution prepared by dissolving 0.5 mol/l of $LiN(CF_3SO_2)_2$ as the lithium salt in the mixture containing 1,3-dioxolane, tetrahydrofuran, 1,2-dimethoxyethane, and trimethylpropylammonium.bis (trifluoromethylsulfonyl)imide$(CH_3)_3N^+(C_3H_7)N^-(SO_2CF_3)_2$ in a volume ratio of 6.7:6.7:6.7:80. Except for the above, the same procedure as that in Example 1 was taken to fabricate a test cell of Example 18.

Figure 40:
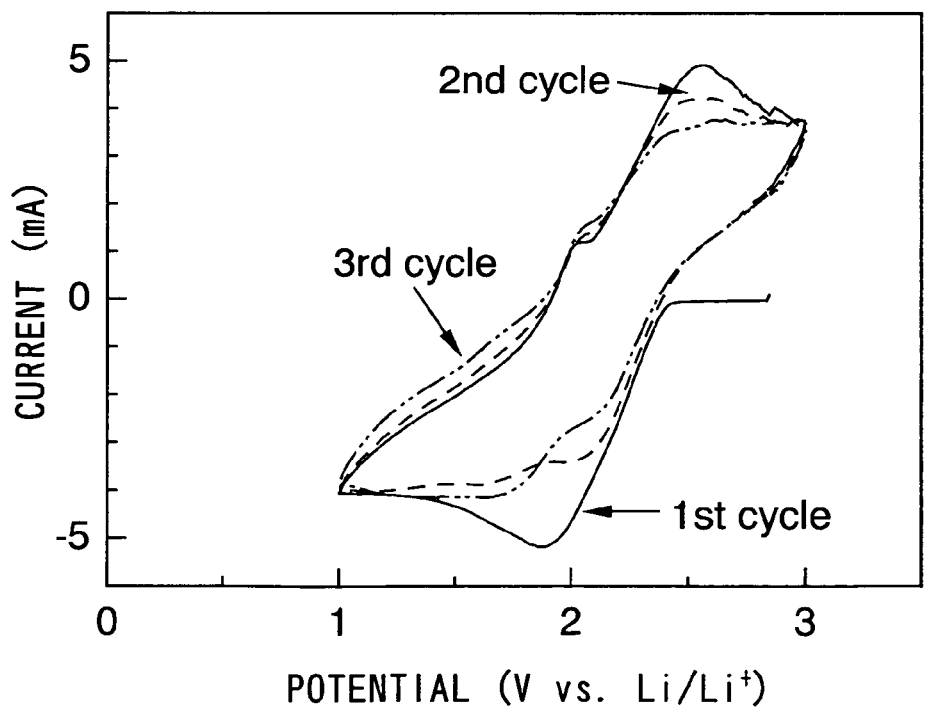
FIG. 40 is a graph representing cyclic voltammetry of a positive electrode measured by scanning potential of the positive electrode of the test cell of Example 18.

In addition, the cyclic volutammetry of the test cell of Example 18 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.85 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 40.

As a result, in the test cell of Example 18, in the scanning in the reduction direction, the reduction peak appeared around 1.9 V (vs.Li/Li$^+$), and sulfur was expectedly reduced. In the scanning in the oxidation direction, the oxidation peak appeared around 2.5 V (vs.Li/Li$^+$), and the reduced sulfur was expectedly oxidized around said potential. The same results were attained also from the second cycle and onwards, and it is believed that sulfur reversibly reacted around 2 V (vs.Li/Li$^+$).

In the mixture of 1,3-dioxolane, tetrahydrofuran, 1,2-dimethoxyethane, and trimethylpropylammonium.bis(trifluoromethylsulfonyl)imide$(CH_3)_3N^+(C_3H_7)N^-(SO_2CF_3)_2$, the ratio of trimethylpropylammonium.bis(trifluoromethylsulfonyl)imide therein is generally set in the range of 0.1 to 99.9% by volume, preferably in the range of 50 to 99.9% by volume, and more preferably in the range of 80 to 99.9% by volume.

EXAMPLE 19

Example 19 used the non-aqueous electrolyte solution prepared by dissolving 0.5 mol/l of $LiN(CF_3SO_2)_2$ as the lithium salt in the mixture containing 50% by volume of 1,3-dioxolane and 50% by volume of 1-ethyl-3-methylimidazolium bis (pentafluoroethylsulfonyl)imide$(C_2H_5)(C_3H_3N_2)^+(CH_3)N^-(SO_2C_2F_5)_2$. Except for the above, the same procedure as that in Example 1 was taken to fabricate a test cell of Example 19.

Figure 41:
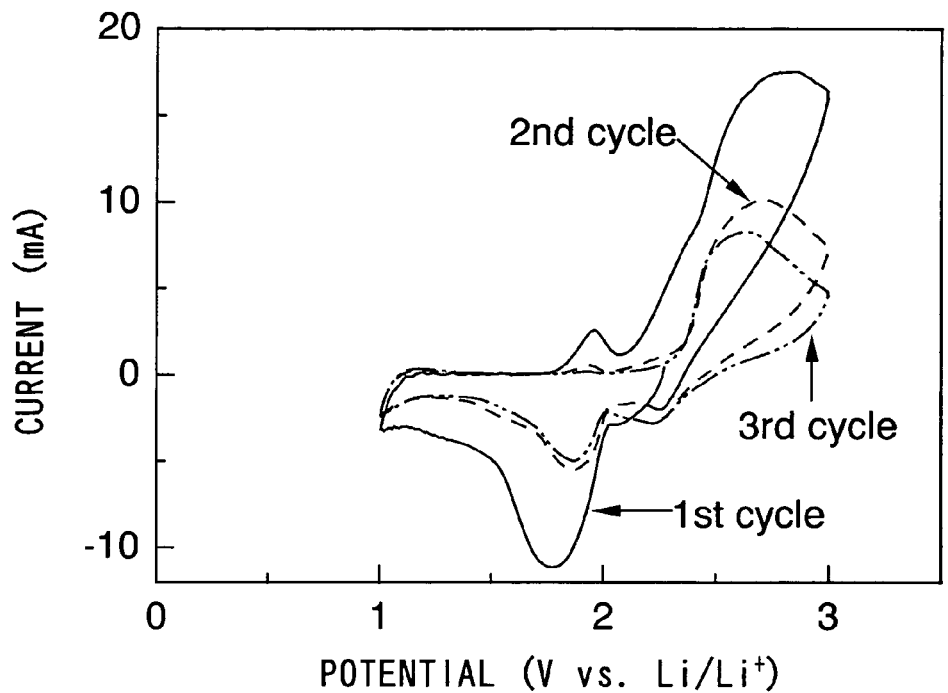
FIG. 41 is a graph representing cyclic voltammetry of a positive electrode measured by scanning potential of the positive electrode of the test cell of Example 19.

In addition, the cyclic volutammetry of the test cell of Example 19 was determined as follows. The potential scanning range of the positive electrode 11 versus the reference electrode 13 was set to be in the range of 1.0 to 3.0 V (vs.Li/Li$^+$), while the potential scanning rate was set to be 1.0 mV/s. Then the operation comprising steps of scanning the initial potential of the positive electrode 11, 2.3 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 41.

As a result, in the test cell of Example 19, in the scanning in the reduction direction, the reduction peak appeared around 1.8 V (vs.Li/Li$^+$), and sulfur was expectedly reduced. In the scanning in the oxidation direction, the oxidation peak appeared around 2.7 V (vs.Li/Li$^+$), and the reduced sulfur was expectedly oxidized around said potential.

Figure 42:
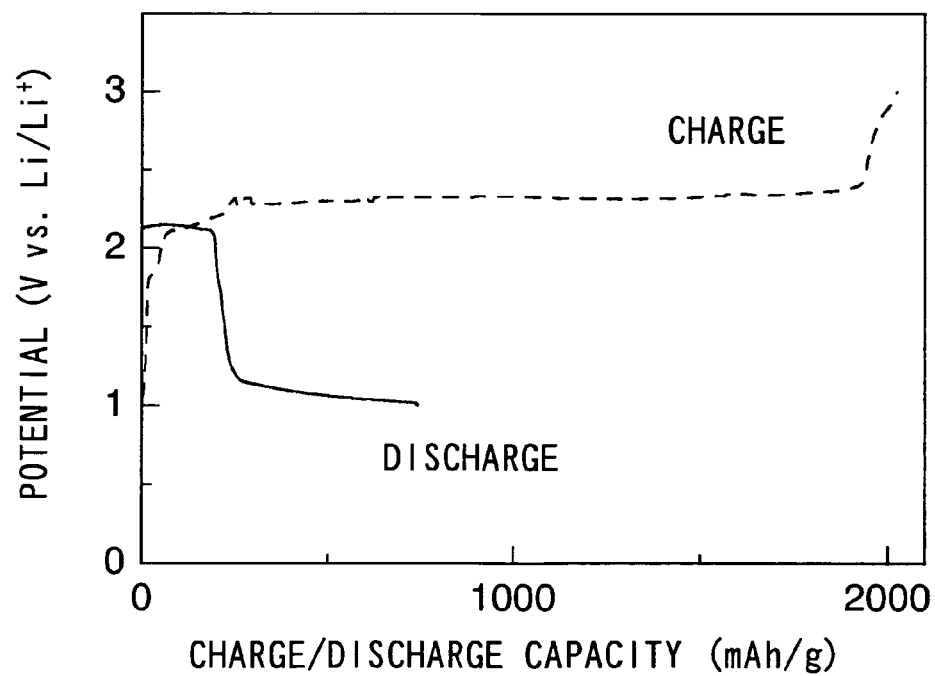
FIG. 42 is a graph representing initial charge/discharge characteristics of the test cell of Example 19.
Figure 4:
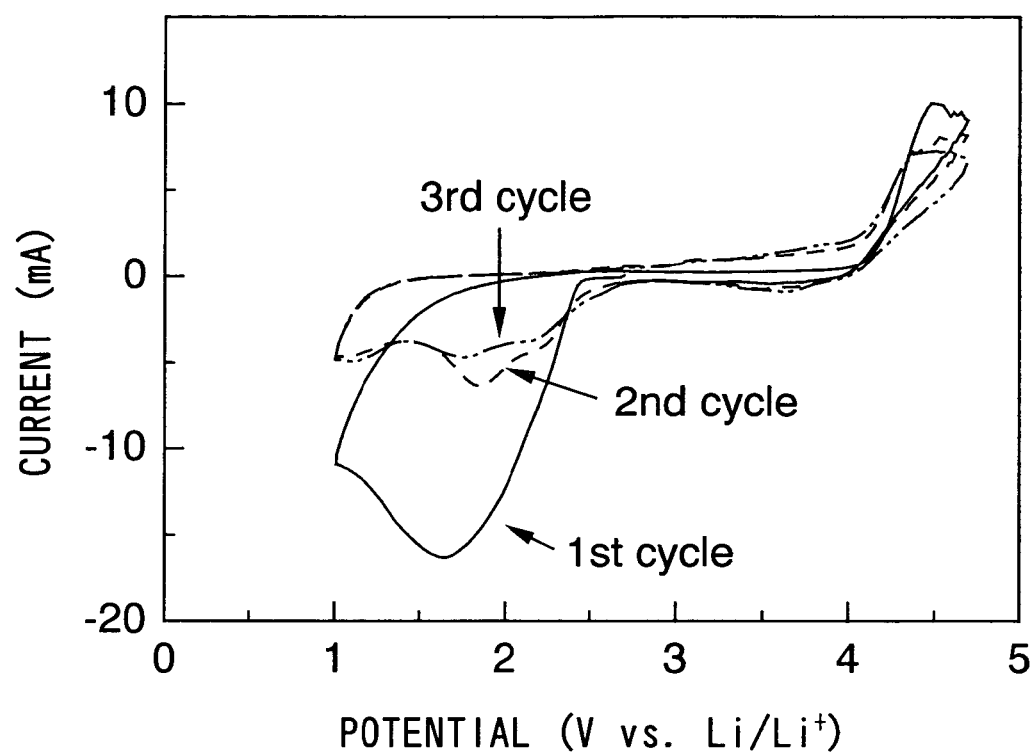

The test cell of Example 19 was subject to the discharge at discharging current of 0.13 mA/cm$^2$ to the discharge cut-off potential of 1.0 V (vs. Li/Li$^+$) and the charge at charging current of 0.13 mA/cm$^2$ to the charge cut-off potential of 3.0V (vs.Li/Li$^+$), so as to inspect the initial charge/discharge characteristics thereof. The results are shown in FIG. 42. The discharge curve showing the relation between the potential in the discharge and capacity density per gram of sulfur is represented by the solid line, whereas the charge curve showing the relation between the potential in the charge and capacity density per gram of sulfur is represented by the broken line.

As a result, in the test cell of Example 19, the initial discharge capacity density per gram of sulfur was 741 mAh/g which was extremely higher than that of $LiCoO_2$ which has been generally used in the positive electrode. Further, where 1,3-dioxolane and 1-ethyl-3-methylimidazolium bis (pentafluoroethylsulfonyl) imide$(C_2H_5)(C_3H_3N_2)^+(CH_3)N^-(SO_2C_2F_5)_2$ were mixed, the capacity density in the discharge around more than 2.0V (vs.Li/Li$^+$) was higher compared with the case in which only 1,3-dioxolane was used.

However, the discharge capacity density thereof was less than those of Examples 10 and 11.

EXAMPLE 20

Example 20 used the non-aqueous electrolyte solution prepared by dissolving 1 mol/l of tetramethylammonium.tetrafluoroborate $(CH_3)_4N^+BF_4^-$ as quaternary ammonium salt and 1 mol/l of $LiPF_6$ as the lithium salt in a mixed solvent containing ethylene carbonate and diethyl carbonate in a volume ratio of 1:1. Except for the above, the same procedure as that in Example 1 was taken to fabricate a test cell of Example 20.

In addition, the cyclic volutammetry of the test cell of Example 20 was determined as follows. The potential scanning range of the positive electrode 11 versus the reference electrode 13 was set to be in the range of 1.0 to 4.7 V (vs.Li/Li$^+$), while the potential scanning rate was set to be 1.0 mV/s. Then the operation comprising steps of scanning the initial potential of the positive electrode 11, 2.7 V (vs.Li/Li$^+$), versus the reference electrode 13 in the reduction direction, and scanning said potential in the oxidation direction was carried out for 3 cycles, so as to determine the cyclic volutammetry at each cycle. The results are shown in FIG. 43.

As a result, in the test cell of Example 20, in the scanning in the reduction direction, the reduction peak appeared around 1.6 V (vs.Li/Li$^+$), and sulfur was expectedly reduced. In the scanning in the oxidation direction, the oxidation peak appeared around 4.4 V (vs.Li/Li$^+$), and the reduced sulfur was expectedly oxidized around said potential. In the second and third cycle, the oxidation and the reduction peaks were less than those in the first cycle, but the oxidation and the reduction peaks appeared in the same way, therefore, it is believed that sulfur reversibly reacted.

INDUSRICAL APPLICABILITY

As described above, in the invention, a non-aqueous electrolyte secondary cell is provided with a positive electrode comprising only a simple substance of sulfur as an active material, wherein a non-aqueous electrolyte solution comprises any of a room-temperature molten salt having a melting point of 60° C. or less, the room-temperature molten salt having the melting point of 60° C. or less and lithium salt, the room-temperature molten salt having the melting point of 60° C. or less and at least one solvent selected from circular ether, chain ether, and carbonate fluoride, or a quaternary ammonium salt and a lithium salt, so that sulfur in the positive electrode reversibly reacts with lithium even in normal temperature and the non-aqueous electrolyte secondary cell is capable of charge/discharge reactions in the normal temperature.

In addition, where the non-aqueous electrolyte solution comprises the room-temperature molten salt having the melting point of 60° C. or less and sulfur reduction product, sulfur reversibly reacts with lithium in the positive electrode in the normal temperature, the non-aqueous electrolyte secondary cell is capable of charge/discharge reactions in the normal temperature, and even in a case in which the positive electrode comprises sulfur, the non-aqueous electrolyte secondary cell is charged/discharged in the normal temperature.

In the non-aqueous electrolyte secondary cell according to the present invention, where the positive electrode comprises sulfur, capacity per unit weight is further improved compared with the case in which an organic disulfide compound is used.

What is claimed:

1. A non-aqueous electrolyte secondary cell provided with a positive electrode, a negative electrode, and a non-aqueous electrolyte solution, wherein said positive electrode comprises elemental sulfur as an active material and said non-aqueous electrolyte solution comprises a room-temperature molten salt having a melting point of 60° C. or less,
wherein said room-temperature molten salt having the melting point of 60° C. or less in the non-aqueous electrolyte solution is a quaternary ammonium salt.

2. The non-aqueous electrolyte secondary cell as claimed in claim 1, wherein said negative electrode comprises material capable of absorbing and desorbing lithium.

3. The non-aqueous electrolyte secondary cell as claimed in claim 1, wherein said negative electrode comprises carbon material or silicon material.

4. The non-aqueous electrolyte secondary cell as claimed in claim 1, wherein said quaternary ammonium salt is at least one of trimethylpropylammonium.bis(trifluoromethylsulfonyl)imide, trimethyloctylammonium.bis(trifluoromethylsulfonyl)imide, trimethylallylammonium.bis(trifluoromethylsulfonyl)imide, trimethylhexylammonium.bis(trifluoromethylsulfonyl)imide, trimethylethylammonium.2,2,2-trifluoro-N-(trifluoromethylsulfonyl)acetamide, trimethylallylammonium.2,2,2-trifluoro-N-(trifluoromethylsulfonyl)acetamide, trimethylpropylammonium.2,2,2-trifluoro-N-(trifluoromethylsulfonyl)acetamide, tetraethylammonium.2,2,2-trifluoro-N-(trifluoromethylsulfonyl) acetamide, and triethylmethylammonium.2,2,2-trifluoro-N-(trifluoromethylsulfonyl)acetamide.

5. The non-aqueous electrolyte secondary cell as claimed in claim 1, wherein said non-aqueous electrolyte solution comprises 50% by volume or more of the room-temperature molten salt having the melting point of 60° C. or less as a solvent thereof.

6. The non-aqueous electrolyte secondary cell as claimed in claim 1, wherein said non-aqueous electrolyte solution comprises the room-temperature molten salt having the melting point of 60° C. or less and a lithium salt.

7. The non-aqueous electrolyte secondary cell as claimed in claim 1, wherein conductive agent is added to said positive electrode.

8. A non-aqueous electrolyte secondary cell provided with a positive electrode, a negative electrode, and a non-aqueous electrolyte solution, wherein said non-aqueous electrolyte solution comprises a room-temperature molten salt having a melting point of 60° C. or less and sulfur reduction product; and wherein said positive electrode comprises elemental sulfur as an active material.

9. The non-aqueous electrolyte secondary cell as claimed in claim 8, wherein said negative electrode comprises material capable of absorbing and desorbing lithium.

10. The non-aqueous electrolyte secondary cell as claimed in claim 8, wherein said negative electrode comprises carbon material or silicon material.

11. The non-aqueous electrolyte secondary cell as claimed in claim 8, wherein said room-temperature molten salt having the melting point of 60° C. or less in the non-aqueous electrolyte solution is a quaternary ammonium salt.

12. The non-aqueous electrolyte secondary cell as claimed in claim 11, wherein said quaternary ammonium salt is at least one of trimethylpropylammonium.bis(trifluoromethylsulfonyl)imide, trimethyloctylammonium.bis(trifluoromethylsulfonyl)imide, trimethylallylammonium.bis(trifluoromethylsulfonyl)imide, trimethylhexylammonium.bis(trifluoromethylsulfonyl)imide, trimethylethylammonium.2,2,2-trifluoro-N-(trifluoromethylsulfonyl)

trimethylallylammonium.2,2,2-trifluoro-N-(trifluoromethylsulfonyl)acetamide, trimethylpropylammonium.2,2,2-trifluoro-N-(trifluoromethylsulfonyl)acetamide, tetraethylammonium.2,2,2-trifluoro-N-(trifluoromethylsulfonyl) acetamide, and triethylmethylammonium.2,2,2-trifluoro-N-(trifluoromethylsulfonyl)acetamide.

13. The non-aqueous electrolyte secondary cell as claimed in claim 9, wherein said sulfur reduction product is elemental sulfur reduced in the room-temperature molten salt having the melting point of 60° C. or less.

14. A non-aqueous electrolyte secondary cell provided with a positive electrode, a negative electrode, and a non-aqueous electrolyte solution, wherein said positive electrode comprises elemental sulfur as an active material and said non-aqueous electrolyte solution comprises a room-temperature molten salt having a melting point of 60° C. or less and at least one solvent selected from cyclic ether, chain ether, and carbonate fluoride;

wherein said room-temperature molten salt having the melting point of 60° C. or less in the non-aqueous electrolyte solution is a quaternary ammonium salt.

15. The non-aqueous electrolyte secondary cell as claimed in claim 14, wherein said negative electrode comprises material capable of absorbing and desorbing lithium.

16. The non-aqueous electrolyte secondary cell as claimed in claim 14, wherein said negative electrode comprises carbon material or silicon material.

17. The non-aqueous electrolyte secondary cell as claimed in claim 16, wherein said non-aqueous electrolyte solution comprises 50% by volume or more of the room-temperature molten salt having the melting point of 60° C. or less as a solvent thereof.

18. The non-aqueous electrolyte secondary cell as claimed in claim 14, wherein said quaternary ammonium salt is at least one of trimethylpropylammonium.bis(trifluoromethylsulfonyl)imide, trimethyloctylammonium.bis(trifluoromethylsulfonyl)imide, trimethylallylammonium.bis(trifluoromethylsulfonyl)imide, trimethylhexylammonium.bis(trifluoromethylsulfonyl)imide, trimethylethylammonium.2,2,2-trifluoro-N-(trifluoromethylsulfonyl)acetamide, trimethylallylammonium.2,2,2-trifluoro-N-(trifluoromethylsulfonyl)acetamide, trimethylpropylammonium.2,2,2-trifluoro-N-(trifluoromethylsulfonyl)acetamide, tetraethylammonium.2,2,2-trifluoro-N-(trifluoromethylsulfonyl)acetamide, and triethylmethylammonium.2,2,2-trifluoro-N-(trifluoromethylsulfonyl)acetamide.

19. The non-aqueous electrolyte secondary cell as claimed in claim 14, wherein said cyclic ether is at least one of 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether, said chain ether is at least one of 1,2-dimethoxyethane, diethyl ether, dipropyl ether, diisopropyl ether, dibuthyf ether, dihexyl ether, ethylvinyl ether, buthylvinyl ether, methyiphenyl ether, ethyiphenyl ether, buthylphenyl ether, pentyiphenyl ether, methoxy toluene, benzylethyl ether, diphenyl ether, dibenzyl ether, o-dimethoxy benzene, 1,2-diethoxyethane, 1,2-dibutoxyethane, diethylene glycol dimethyl ether, diethylene glycol diethyl ether, diethylene glycol dibuthyl ether, 1,1-dimethoxy methane, 1,1-diethoxy ethane, triethylene glycol dimethyl ether, and tetraethylene glycol dimethyl ether, and said carbonate fluoride is at least one of trifluoropropylene carbonate and fluoroethylene carbonate.

20. A non-aqueous electrolyte secondary cell provided with a positive electrode, a negative electrode comprising material capable of absorbing and desorbing lithium, and a non-aqueous electrolyte solution, wherein said positive electrode comprises only elemental sulfur as an active material and said non-aqueous electrolyte solution comprises a quaternary ammonium salt and a lithium salt.

21. The non-aqueous electrolyte secondary cell as claimed in claim 20, wherein said quaternary ammonium salt is at least one of trimethylpropylammonium.bis(trifluoromethylsulfonyl)imide, trimethyloctylammonium.bis(trifluoromethylsulfonyl)imide, trimethylallylammonium.bis(trifluoromethylsulfonyl)imide, trimethylhexylammonium.bis(trifluoromethylsulfonyl)imide, trimethylethylammonium.2,2,2-trifluoro-N-(trifluoromethylsulfonyl) acetamide, trimethylallylammonium.2,2,2-trifluoro-N-(trifluoromethylsulfonyl) acetamide, trimethylpropylammonium.2,2,2-trifluoro-N-(trifluoromethylsulfonyl) acetamide, tetraethylammonium.2,2,2-trifluoro-N-(trifluoromethylsulfonyl) acetamide, triethylmethylammonium.2,2,2-trifluoro-N-(trifluoromethylsulfonyl) acetamide, tetramethylammonium.tetrafluoroborate, tetramethylammonium.hexafluorophosphate, tetraethylammonium.tetrafluoroborate, and tetraethylammonium.hexafluorophosphate.

* * * * *